United States Patent
Revesz

(10) Patent No.: US 9,224,155 B2
(45) Date of Patent: Dec. 29, 2015

(54) SYSTEMS AND METHODS FOR MANAGING PUBLICATION OF ONLINE ADVERTISEMENTS

(71) Applicant: AOL Inc., Dulles, VA (US)

(72) Inventor: Jeffrey Revesz, New York, NY (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 14/513,181

(22) Filed: Oct. 13, 2014

(65) Prior Publication Data

US 2015/0032518 A1 Jan. 29, 2015

Related U.S. Application Data

(63) Continuation of application No. 13/272,813, filed on Oct. 13, 2011, now Pat. No. 8,862,521.

(51) Int. Cl.
G06Q 30/02 (2012.01)
G06F 17/30 (2006.01)
G06N 7/00 (2006.01)
G06N 99/00 (2010.01)

(52) U.S. Cl.
CPC ........ *G06Q 30/0241* (2013.01); *G06F 17/3089* (2013.01); *G06N 7/005* (2013.01); *G06N 99/005* (2013.01); *G06Q 30/0254* (2013.01); *G06Q 30/0277* (2013.01)

(58) Field of Classification Search
USPC .......................................................... 706/12
See application file for complete search history.

(56) References Cited

U.S. PATENT DOCUMENTS

2009/0125371 A1 5/2009 Neylon et al.

OTHER PUBLICATIONS

Androutsopoulos, An Evaluation of Naive Bayesian Anti-Spam Filtering. 11th European Conference on Machine Learning, Barcelona, Spain, pp. 9-17 [online], 2000 [retrieved on Jan. 12, 2015]. Retrieved from the Internet<URL: http://www.google.com/url?sa=t&rct=j&q=&esrc=s&frm=1&source=web&cd=5&cad=rja&uact=8&ved=0CDwQFjAE&url=http%3A%2F%2Farxiv.org>.*

Broder et al., A Semantic Approach to Contextual Advertising, SIGIR '07 [online], 2007 [retrieved on Nov. 6, 2013]. Retrieved from the Internet:<URL: http://www.google.com/url?sa=t&rct=j&q=&esrc=s&frm=1&source=web&cd=5&ved=0CEcQFjAE&url=http%3A%2F%2Ffontoura.org%2Fpapers%2Fsemsyn.pdf>.

Zhang et al., Learning from Multitopic Web Documents for Contextual Advertisement, KDD'08 [online], Aug. 24-27, 2008 [retrieved on Nov. 6, 2013]. Retrieved from the Internet<URL: http://research.microsoft.com/en-us/um/people/acsuren/kdd593-zhang.pdf>.

(Continued)

*Primary Examiner* — Li-Wu Chang
*Assistant Examiner* — Nathan Brown, Jr.
(74) *Attorney, Agent, or Firm* — Finnegan, Henderson, Farabow, Garrett & Dunner, LLP

(57) ABSTRACT

Exemplary embodiments provide systems, devices, one or more non-transitory computer-readable media and computer-executable methods for managing publication of online advertising. In exemplary embodiments, computer-based publication techniques may include, but is not limited to, automatically determining whether the content of a particular web page article is suitable or unsuitable for accompaniment with one or more advertisements, automatically determining whether an advertisement is suitable or unsuitable for publication on a web page associated with a web page article, and automatically determining a category that may be used to classify the content of a web page article in order to select one or more categories of advertisements suitable for accompaniment with the web page article.

28 Claims, 17 Drawing Sheets

(56) References Cited

OTHER PUBLICATIONS

A European Search Report mailed Jun. 20, 2013, in European Patent Application No. 12007096.2 (9 pages).
Cavnar, et al., "N-Gram-Based Text Categorization," Proceedings of the Annual Symposium on Document Analysis & Information Retrieval, Apr. 1996 (9 pages).
Bai, et al., "Bayesian Learning of N-Gram Statistical Language Modeling", Proceedings of the 2006 IEEE Conference on Acoustics, Speech, and Signal Processing, May 14, 2006 (4 pages).
Schapire, "The Boosting Approaching to Machine Learning an Overview", MSRI Workshop of Nonlinear Estimation and Classification, 2002 (23 pages).

* cited by examiner

SYSTEMS AND METHODS FOR MANAGING PUBLICATION OF ONLINE ADVERTISEMENTS

CROSS REFERENCE TO RELATED APPLICATION(S)

This application is a continuation application of and claims priority to U.S. patent application Ser. No. 13/272,813, filed on Oct. 13, 2011 (now allowed), which is incorporated herein by reference in its entirety.

BACKGROUND

Many Internet websites, including commercial and personal websites, publish advertisements on particular web pages. The human administrators of many websites use their personal discretion and judgment in determining whether to publish particular advertisements on particular web pages. However, such reliance on human administrators tends to make the advertisement publication and management process time-consuming and error-prone. For example, human administrators of fast-growing websites may be unable to keep pace with the rapid generation of new web pages and content contained in such web pages, resulting in long delays in the publication of advertisements on the web pages.

SUMMARY

Exemplary embodiments are taught herein relating to systems and methods for managing publication of online advertisements.

In accordance with one exemplary embodiment, a computer-executable method is provided for managing publication of a web page article using a computing device. The method includes using a trained machine learning system implementing a machine learning algorithm embodied on one or more computer-readable media, processing the web page article to generate a first numeric likelihood that the web page article is associated with a first selected category of web page articles unsuitable for accompaniment with advertising. The method also includes comparing, using the computing device, the first numeric likelihood to a first set of one or more threshold values associated with the first selected category. The method further includes determining, using the computing device, whether to publish an advertisement on a web page associated with the web page article or to exclude advertisements from publication on a web page associated with the web page article based on the comparison of the first numeric likelihood to the first set of threshold values.

In accordance with another exemplary embodiment, a computer-executable method is provided for managing publication of a web page article using a computing device. The method includes selecting an advertisement for publication on a web page associated with the web page article, and reviewing a tag associated with the web page article, the tag indicating that the web page article is associated with a first selected category of web page articles. The method also includes automatically determining whether to publish the advertisement on a web page associated with the web page article based on the reviewing of the tag associated with the web page article.

In accordance with another exemplary embodiment, one or more non-transitory computer-readable media are provided. The computer-readable media are encoded with computer-executable instructions for performing a method for managing publication of a web page article using a computing device. The method includes using a trained machine learning system implementing a machine learning algorithm embodied on one or more computer-readable media, processing the web page article to generate a first numeric likelihood that the web page article is associated with a first selected category of web page articles unsuitable for accompaniment with advertising. The method also includes comparing, using the computing device, the first numeric likelihood to a first set of one or more threshold values associated with the first selected category. The method further includes determining, using the computing device, whether to publish an advertisement on a web page associated with the web page article or to exclude advertisements from publication on a web page associated with the web page article based on the comparison of the first numeric likelihood to the first set of threshold values.

In accordance with another exemplary embodiment, one or more non-transitory computer-readable media are provided. The computer-readable media are encoded with computer-executable instructions for performing a method for managing publication of a web page article using a computing device. The method includes selecting an advertisement for publication on a web page associated with the web page article, and reviewing a tag associated with the web page article, the tag indicating that the web page article is associated with a first selected category of web page articles. The method also includes automatically determining whether to publish the advertisement on a web page associated with the web page article based on the reviewing of the tag associated with the web page article.

BRIEF DESCRIPTION OF THE DRAWINGS

The foregoing and other objects, aspects, features and advantages of exemplary embodiments will be more fully understood from the following description when read together with the accompanying drawings, in which.

DETAILED DESCRIPTION

Figure 1:
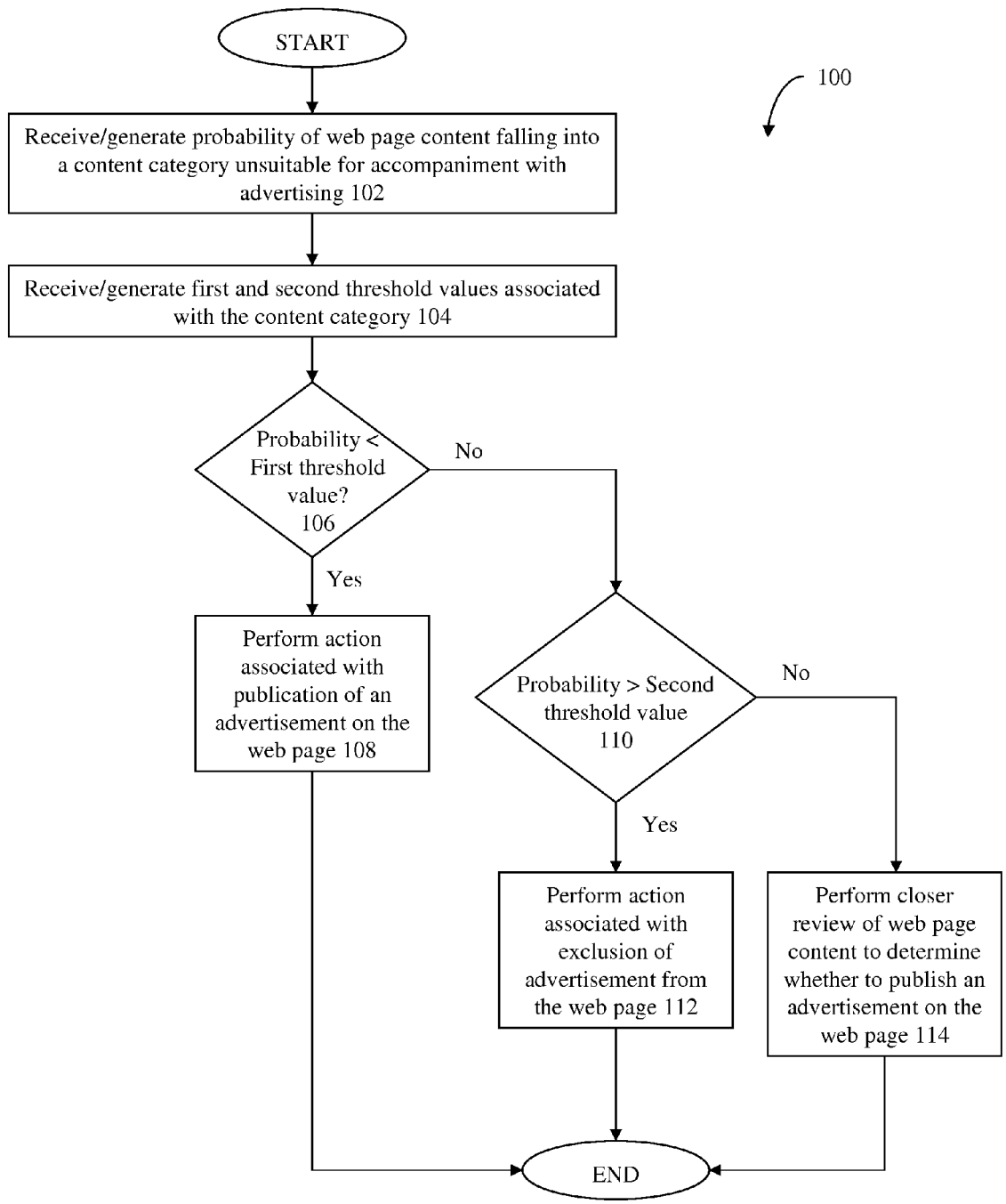
FIG. 1 is a flowchart illustrating an exemplary computer-implemented and computer-executable method that may be used to determine whether a particular web page article is suitable for accompaniment with one or more advertisements.

Exemplary embodiments address deficiencies of conventional advertising publication technologies. Exemplary embodiments provide systems, devices, one or more non-transitory computer-readable and computer-executable methods for computer-based publication of online advertising. In exemplary embodiments, computer-based publication techniques may include, but are not limited to, automatically determining whether the content of a particular web page article is suitable or unsuitable for accompaniment with any advertising, automatically determining whether the content of a particular web page article is suitable or unsuitable for accompaniment with a particular advertisement, automatically determining whether a particular advertisement is suitable or unsuitable for publication on a web page associated with a web page article, and automatically determining a category that may be used to classify the content of a web page article in order to select one or more categories of advertisements suitable for publication on a web page associated with the web page article, and the like.

Exemplary embodiments may specify one or more binary categories that may be used to classify one or more characteristics of a web page article including, but not limited to, the textual content of the web page article, a general topic of the web page article, the author of the web page article, and the like. An exemplary category may further include one or more sub-categories. Certain exemplary categories and sub-categories may classify a characteristic of the textual content of the web page article including, but not limited to, scary content, salacious content, and the like. Certain exemplary categories and sub-categories may classify a topic of the web page article including, but not limited to, travel-related content, accident-related content, politics-related content, and the like. In an exemplary embodiment, the category may be associated with the web page article and may be stored in a storage device in the form of a tag associated with the web page article.

Exemplary embodiments may specify one or more binary categories that may be used to classify one or more characteristics of an advertisement including but not limited to, the textual content of the advertisement, a general topic of the advertisement, the product and/or the business entity being advertised, and the like. An exemplary category may further include one or more sub-categories. Certain exemplary categories and sub-categories may classify a characteristic of the textual content of the advertisement including, but not limited to, scary content, salacious content, and the like. Certain exemplary categories and sub-categories may classify a topic of the advertisement including, but not limited to, transportation-related content, hotel-related content, vacation-deal-related content, life-insurance-related content, and the like. In an exemplary embodiment, the category may be associated with the advertisement and may be stored in a storage device in the form of a tag associated with the advertisement.

Exemplary embodiments may provide computing systems, computing devices and computer-executable methods for using machine learning tools to automatically analyze the textual content of a web page article. The web page article may include free-text content or textual content conforming to any particular textual format. Based on the analysis, exemplary embodiments may determine the likelihood that the content of the web page article is either a positive example or a negative example of one or more categories and/or sub-categories that are unsuitable for accompaniment with a particular advertisement or with any and all advertisements, for example, scary content, salacious content. As an example, a web page article with scary content (for example, a news story of serial killings) may be unsuitable for accompaniment with any advertising. As another example, a web page article with scary content (for example, a news story of a plane crash) may be unsuitable for accompaniment with travel advertisements, but may be suitable for accompaniment with life insurance advertisements. In an exemplary embodiment, if the web page article is determined to be a positive example of any of the unsuitable categories and/or sub-categories to a pre-defined degree of certainty, exemplary embodiments may automatically exclude a particular predefined advertisement from publication on a web page associated with the web page article. In another exemplary embodiment, if the web page article is determined to be a positive example of any of the unsuitable categories and/or sub-categories to a predefined degree of certainty, exemplary embodiments may automatically exclude all advertisements from publication on a web page associated with the web page article. In an exemplary embodiment, if the web page article is determined to be a negative example of all of the unsuitable categories and/or sub-categories to a predefined degree of certainty, exemplary embodiments may automatically include one or more advertisements for publication on the web page article.

Exemplary embodiments may provide computing systems, computing devices and computer-executable methods for using machine learning tools to automatically analyze the textual content of an advertisement. The advertisement may include free-text content or textual content conforming to any particular format. Based on the analysis, exemplary embodiments may determine the likelihood that the textual content of the advertisement is either a positive example or a negative example of one or more categories and/or sub-categories, for example, scary, salacious, and the like, that are unsuitable for publication on a web page associated with a web page article. In an exemplary embodiment, if the advertisement is determined to be a positive example of any of the unsuitable categories and/or sub-categories to a predefined degree of certainty, exemplary embodiments may automatically exclude the advertisement from publication on a web page associated with the web page article. In an exemplary embodiment, if the advertisement is determined to be a negative example of all of the unsuitable categories and/or sub-categories to a predefined degree of certainty, exemplary embodiments may automatically include the advertisement for publication on a web page associated with the web page article.

Exemplary embodiments may provide computing systems, computing devices and computer-executable methods for using machine learning tools to automatically analyze the textual content of a web page article. The web page article may include free-text content or textual content conforming to any particular format. Based on the analysis, exemplary embodiments may determine the likelihood that the web page article content is either a positive example or a negative example of one or more categories and/or sub-categories, for example, travel-related content, politics-related content, and the like. If the web page article is determined to be a positive example of one or more categories and/or sub-categories to a predefined degree of certainty, exemplary embodiments may select one or more advertisements that are suitable for publication on a web page associated with the web page article based on the categorization of the web page article.

Because exemplary embodiments allow automatic computer-based publication of advertising on a web page associated with a web page article, the publication process is fast-paced and is capable of keeping pace with fast generation of new web page articles and advertisements. Exemplary embodiments may perform fully automatic publication of advertisements, for example, by automatically determining whether to publish one or more advertisements on a web page associated with a web page article. In some exemplary embodiments, one or more human reviewers may be used along with automatic computer-based tools in publishing one or more advertisements on a web page associated with a web page article. Exemplary embodiments may perform automatic publication of advertisements with optional user involvement and supervision, for example, by requesting a user to confirm whether to publish one or more advertisements on a web page associated with a web page article.

I. DEFINITIONS

Certain terms are defined in this section to facilitate understanding of exemplary embodiments.

The term "web page article" refers to a portion of the textual content of a web page taking any suitable publication format including, but not limited to, a web page article, a web page posting, a web page blog, and the like.

The term "set" refers to a collection of one or more items.

The terms "reference corpus," "reference database," and "reference examples" refer to a collection of textual examples that, for a particular category, are classified as either positive or negative examples of that particular category. A reference database may contain a collection of positive or negative textual examples for a single category or for a plurality of textual categories.

The term "n-gram" refers to a sub-sequence of n consecutive textual items from a particular textual sequence. An n-gram of size one is referred to as a "unigram, an n-gram of size two is referred to as a "bigram" and an n-gram of size three is referred to as a "trigram."

The term "feature" refers to an n-gram. Textual features may be sorted into n-gram sub-sequences for processing by a machine learning system implementing a machine learning algorithm embodied on one or more computer-readable media. Features used to sort textual features may include different types of n-grams, for example, unigrams and bigrams, unigrams and bigrams and trigrams, and the like.

The term "stop word" refers to a word, a collection of words or any other textual feature that is highly common in natural language text and that does not contribute to the predictive value of determining whether a piece of text is a positive or a negative example of a selected category. A collection of stop words usable in accordance with exemplary embodiments may be predefined and updated by a user. Exemplary stop words may include, but are not limited to, "a," "the," and the like.

The term "vector" refers to a representation of a particular textual content as a vector in a hyperspace. The hyperspace may be a multi-dimensional space to which a text categorization problem is mapped in order to facilitate a machine learning system implementing a machine learning algorithm embodied on one or more computer-readable media to process and analyze the problem. Exemplary vectors may be generated and processed by a computing device, a computing system and/or a computer-executable method.

The term "training vector" refers to a vector that is used in training a machine learning system implementing a machine learning algorithm embodied on one or more computer-readable media.

The term "testing vector" refers to a vector that is used in testing a trained machine learning system implementing a machine learning algorithm embodied on one or more computer-readable media.

The term "weak learner" refers to a computer-implemented and computer-executable textual classifier that follows a set of one or more rules to classify any given piece of text into a positive or a negative example of a selected category.

The term "machine learning system" refers to a computing system implementing a machine learning algorithm embodied on one or more computer-readable media.

The term "boosting algorithm" refers to a computer-implemented and computer-executable method for improving the accuracy of a machine learning system implementing a machine learning algorithm encoded on one or more computer-readable media. Exemplary boosting algorithms usable in accordance with exemplary embodiments may include, but are not limited to, the AdaBoost, icsiboost, textbooster algorithms.

The term "boosting system" refers to a computing system implementing one or more exemplary boosting algorithms embodied on one or more computer-readable media.

II. EXEMPLARY EMBODIMENTS

Exemplary embodiments are described below with reference to the drawings. One of ordinary skill in the art will recognize that exemplary embodiments are not limited to the illustrative embodiments and that the components of exemplary systems, devices and methods are not limited to the illustrative embodiments described below.

FIG. 1 is a flowchart illustrating an exemplary computer-implemented and computer-executable method 100 that may be used to determine whether a particular web page article is suitable for accompaniment with one or more advertisements based on one or more numeric likelihoods that the web page article falls into one or more categories. In an exemplary embodiment, the numeric likelihoods and/or the categories may be provided in the form of one or more tags associated with the web page article. In an exemplary embodiment, the method 100 may perform fully automatic publication of advertisements, for example, by automatically determining whether to publish one or more advertisements on a web page associated with the web page article. In another exemplary embodiment, the method 100 may perform automatic publication of advertisements with optional user involvement and supervision, for example, by requesting a user to confirm whether to publish one or more advertisements on a web page associated with the web page article.

In step 102, exemplary embodiments may receive an indication of whether the web page article content is unsuitable for accompaniment with one or more advertisements. Alternatively, in step 102, exemplary embodiments may analyze the web page article content to generate an indication of whether the web page article content is unsuitable for accompaniment with one or more advertisements. As an example, a web page article with scary content (for example, a news story of serial killings) may be unsuitable for accompaniment with any advertising. As another example, a web page article with other types of scary content (for example, a news story of a plane crash) may be unsuitable for accompaniment with travel advertisements but may be suitable for accompaniment with life insurance advertisements.

The indication may be generated by a trained machine learning system that uses a boosting algorithm. Exemplary indications may take any form suitable for use in method 100 including, but not limited to, one or more quantitative indications (for example, one or more probability values) that indicate the likelihood that the web page article content is a positive example of one or more categories that are suitable and/or unsuitable for accompaniment with one or more advertisements, one or more quantitative indications (for example, one or more probability values) that indicate the likelihood that the web page article content is a negative example of one or more categories that are suitable and/or unsuitable for accompaniment with one or more advertisements, and the like.

In an exemplary embodiment in which a probability value is used as an indication that the web page article content is a positive example of an unsuitable category, the higher the probability value, the higher is the likelihood that the web page article content is unsuitable for accompaniment with advertisements. Similarly, in an exemplary embodiment in which a probability value is used as an indication that the web page article content is a negative example of an unsuitable category, the higher the probability value, the higher is the likelihood that the web page article content is not unsuitable for accompaniment with advertisements.

In the exemplary embodiment illustrated in FIG. 1, the indication is a probability value indicating the likelihood that the web page article content is a positive example of a particular category unsuitable for accompaniment with one or more advertisements. That is, the higher the probability value, the higher is the likelihood that the web page article content is unsuitable for accompaniment with one or more advertisements.

In an exemplary embodiment in which the web page article content is categorized based on a single unsuitable category, the web page article content has a single associated probability value for the category. For example, the web page article may have a probability value associated with a "scary" category of 0.3. In another exemplary embodiment in which the web page article content is categorized based on two or more unsuitable categories, the web page article content has an associated probability value for each unsuitable category. For example, the web page article may have a probability value associated with a "scary" category of about 0.5 and a probability value associated with a "salacious" category of about 0.0.

In step 104, exemplary embodiments may receive or generate one or more threshold values associated with each unsuitable category. The threshold values may be used to automatically determine if the probability value associated with the web page article content is sufficiently high to warrant automatic exclusion of one or more advertisements from publication on a web page associated with the web page article, and/or to determine if the probability value is sufficiently low to warrant automatic publication of one or more advertisements on a web page associated with the web page article. In an exemplary embodiment, the threshold values may be predefined values associated with the web page category. In an exemplary embodiment, the threshold values may be determined based on an analysis of the distribution of web page articles in a reference corpus over varying threshold values.

For example, if it is determined that, among a plurality of web page article examples in the reference corpus, all of the examples having probability values below a particular threshold value are not in the unsuitable category, then that threshold value may be used as a first lower threshold value in exemplary embodiments. Similarly, if it is determined that, among a plurality of web page article examples in the reference corpus, all of the examples having probability values above a particular threshold value are in the unsuitable category, then that threshold value may be used as a second higher threshold value in exemplary embodiments. The second higher threshold value may indicate a probability value at or above which a web page article is likely to fall into the unsuitable category and, therefore, is likely to be unsuitable for accompaniment with one or more advertisements. The first lower threshold value may indicate a probability value at or below which a web page article is unlikely to fall into the unsuitable category and, therefore, is unlikely to be unsuitable for accompaniment with one or more advertisements.

In an exemplary embodiment, the one or more threshold values may be set to the same value over all of the unsuitable categories. In another exemplary embodiment, the threshold values may be set to different values for different unsuitable categories, for example, the threshold values may be lower for a category like "salacious" and higher for a category like "scary."

Exemplary embodiments may compare the probability values associated with the particular web page article falling into one or more unsuitable categories against the threshold values associated with the unsuitable categories. In an exemplary embodiment, a lower first threshold value and a lower second threshold value may be used for each unsuitable category.

In step 106, exemplary embodiments may determine if the probability values associated with the web page article for one or more unsuitable categories are all lower than the first lower threshold values associated with the unsuitable categories. Alternatively, exemplary embodiments may determine if the probability values associated with the web page article for one or more unsuitable categories are all equal to or lower than the first lower threshold values associated with the unsuitable categories.

In an exemplary embodiment in which a single unsuitable category is used, the web page article has a single probability value associated with that unsuitable category (for example, that the web page article has a probability value of 0.45 of falling in the "scary" category). In this exemplary embodiment, step 106 compares the single probability value with the first lower threshold value associated with the single unsuitable category (for example, compares 0.45 with a first lower threshold value of 0.4 for the "scary" category).

A probability value associated with an unsuitable category that is lower than the first lower threshold value associated with the unsuitable category indicates that it is likely that the web page article may not be unsuitable for accompaniment with one or more advertisements, and that one or more advertisements may be automatically published on the web page article (by taking the "Yes" branch). In this case, exemplary embodiments may automatically publish a particular set of one or more advertisements on a web page associated with the web page article, or may automatically publish any advertisement on a web page associated with the web page article. Otherwise, exemplary embodiments may not automatically publish one or more advertisements on a web page associated with the web page article, and the "No" branch is taken.

In another exemplary embodiment in which two or more unsuitable categories are used, the web page article has two or more associated probability values, each probability value associated with one of the unsuitable categories (for example, that the web page article has a probability value of 0.3 of falling into the "scary" category and a probability value of 0.1 of falling into the "salacious" category). In this exemplary embodiment, step 106 compares the probability value associated with each unsuitable category with the first lower threshold value associated with that particular unsuitable category (for example, compares 0.3 with a first lower threshold value of 0.2 for the "scary" category, and compares 0.1 with a first lower threshold value of 0.3 for the "salacious" category).

A probability value associated with each unsuitable category that is lower than the first lower threshold value associated with that unsuitable category indicates that it is likely that the web page article may not be unsuitable for accompaniment with one or more advertisements, and that one or more advertisements may be automatically published on the web page article (by taking the "Yes" branch). That is, the probability values for all of the unsuitable categories must meet the lower-than-first-threshold requirement for automatic publication of one or more advertisements on the web page article. In this case, exemplary embodiments may automatically publish a particular set of one or more advertisements on a web page associated with the web page article or may automatically publish any advertisement on a web page associated with the web page article. Otherwise, exemplary embodiments may not automatically publish one or more advertisements on the web page article, and the "No" branch is taken.

The decision on whether to automatically publish a particular advertisement on a web page associated with a web page article may be based on whether the web page article is a negative example of one or more unsuitable categories. In another exemplary embodiment, the decision on whether to automatically publish a particular advertisement on a web page associated with a web page article may be based on whether the web page article is a negative example of one or more unsuitable categories and also on a category of the textual content of the advertisement. The category of the advertisement may be determined by an exemplary machine learning system that uses a boosting algorithm.

In step 108, one or more actions associated with the automatic publication of one or more advertisements on a web page associated with the web page article may be performed. The one or more actions may include, but are not limited to, automatically publishing one or more advertisements on a web page associated with the web page article, scheduling automatic publication of one or more advertisements on a web page associated with the web page article, designating one or more advertisements for automatic publication on a web page associated with the web page article, designating the web page article as being suitable for accompaniment with one or more advertisements, and the like.

Returning to step 106, if the "No" branch is taken, this indicates that there is a sufficient likelihood that the web page article may be a positive example of a category unsuitable for accompaniment with one or more advertisements. In step 110, exemplary embodiments may determine if the probability values associated with the web page article for one or more unsuitable categories are higher than the second higher threshold values associated with the unsuitable categories. Alternatively, exemplary embodiments may determine if the probability values associated with the web page article for one or more unsuitable categories are equal to or higher than the second higher threshold values associated with the unsuitable categories In an exemplary embodiment in which a single unsuitable category is used, the web page article has a single probability value associated with that unsuitable category (for example, that the web page article has a probability value of 0.45 of falling in the "scary" category). In this exemplary embodiment, step 110 compares the single probability value with the second higher threshold value associated with the single unsuitable category (for example, compares 0.45 with a second higher threshold value of 0.9 for the "scary" category).

A probability value associated with an unsuitable category that is higher than the second higher threshold value associated with the unsuitable category indicates that it is likely that the web page article may be unsuitable for accompaniment with one or more advertisements, and one or more advertisements may be automatically excluded from publication on the web page article (by taking the "Yes" branch). In this case, exemplary embodiments may automatically exclude a particular set of one or more advertisements from publication on a web page associated with the web page article, or may automatically exclude any and all advertisements from publication on a web page associated with the web page article.

Otherwise, the web page article may require review, for example, by a human reviewer. In this case, the "No" branch is taken.

In another exemplary embodiment in which two or more unsuitable categories are used, the web page article has two or more associated probability values, each probability value associated with one of the unsuitable categories (for example, that the web page article has a probability value of 0.3 of falling into the "scary" category and a probability value of 0.1 of falling into the "salacious" category). In this exemplary embodiment, step 110 compares the probability value associated with each unsuitable category with the second higher threshold value associated with that particular unsuitable category (for example, compares 0.3 with a second higher threshold value of 0.75 for the "scary" category, and compares 0.1 with a second higher threshold value of 0.8 for the "salacious" category).

If the probability value associated with any unsuitable category is higher than the second higher threshold value of that unsuitable category, this indicates that it is likely that the web page article is unsuitable for accompaniment with one or more advertisements, and that one or more advertisements may be automatically excluded from publication on the web page article (by taking the "Yes" branch). That is, one or more advertisements may be automatically excluded from publication on the web page article if the probability value for any of the unsuitable categories meets the higher-than-second-threshold requirement. Exemplary embodiments may automatically exclude a particular set of one or more advertisements from publication on the web page article. Exemplary embodiments may automatically exclude any and all advertisements from publication on the web page article. Otherwise, the web page article may require review, for example, by a human reviewer. In this case, the "No" branch is taken.

In an exemplary embodiment, the decision on whether to automatically exclude a particular advertisement from publication on the web page article may be based on whether the web page article is a positive example of one or more unsuitable categories. In another exemplary embodiment, the decision on whether to automatically exclude a particular advertisement from publication on the web page article may be based on whether the web page article is a positive example of one or more unsuitable categories and also on a category of the textual content of the advertisement. For example, only certain categories of advertisements may be published on a certain category of web page article. The category of the advertisement may be determined by an exemplary machine learning system implementing a machine learning and boosting algorithm encoded on one or more computer-readable media.

In step 112, one or more actions associated with the automatic exclusion of one or more advertisements from publication on the web page article may be performed. The one or more actions may include, but are not limited to, automatically publishing the web page article without one or more advertisements, automatically designating the web page article as being unsuitable for accompaniment with one or more advertisements, automatically scheduling the web page article for publication without one or more advertisements, and the like.

Returning to step 110, if the "No" branch is taken, this indicates that it is unclear if the web page article is suitable or unsuitable for accompaniment with one or more advertisements. In step 114, exemplary embodiments may send the textual content of the web page article along with the associated probability value or score to a human reviewer who may review the web page article and decide whether to publish the web page article with one or more advertisements.

Figure 2:
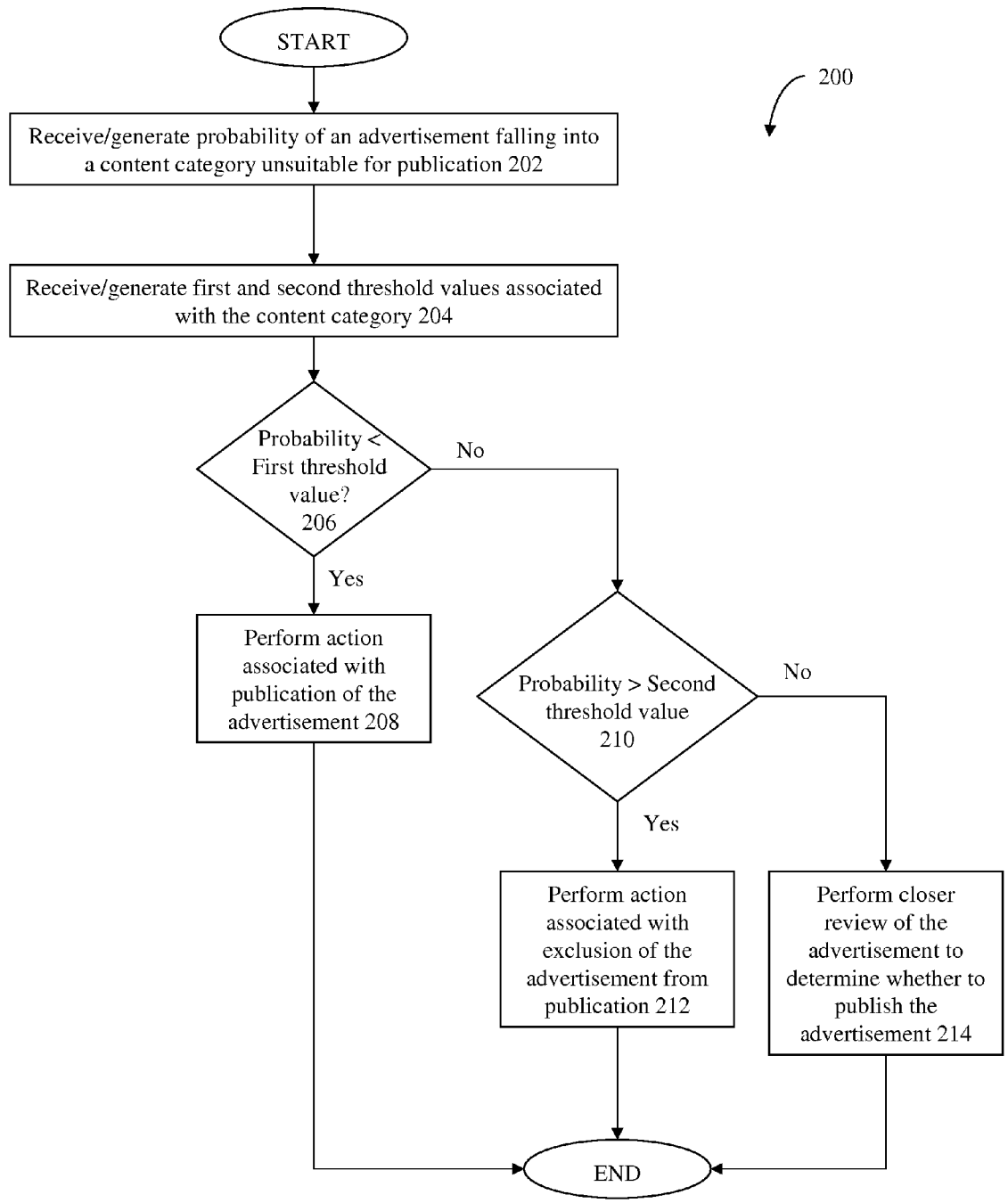
FIG. 2 is a flowchart illustrating an exemplary computer-implemented and computer-executable method that may be used to determine whether a particular advertisement is suitable for publication on a web page associated with a web page article.

FIG. 2 is a flowchart illustrating an exemplary computer-implemented and computer-executable method 200 that may be used to determine whether a particular advertisement is suitable for publication on a web page associated with a web page article based on one or more numeric likelihoods that the advertisement falls into one or more categories. In an exemplary embodiment, the numeric likelihoods and/or the categories may be provided in the form of one or more tags associated with the advertisement. In an exemplary embodiment, the method 200 may perform fully automatic publication of the advertisement, for example, by automatically determining whether to publish the advertisement on the web page article. In another exemplary embodiment, the method 200 may perform automatic publication of the advertisement with optional user involvement and supervision, for example, by requesting a user to confirm whether to publish the advertisement on the web page article.

In step 202, exemplary embodiments may receive an indication on whether the textual content of the advertisement is unsuitable for publication on the web page article. Alternatively, in step 202, exemplary embodiments may analyze the content of the advertisement to generate an indication on whether the advertisement is unsuitable for publication on the web page article. The indication may be generated by an exemplary trained machine learning system that implements a machine learning and boosting algorithm encoded on one or more computer-readable media. Exemplary indications may take any form suitable for use in method 200 including, but not limited to, one or more quantitative indications (for example, one or more probability values) that indicate the likelihood that the textual content of the advertisement falls into one or more categories that are suitable and/or unsuitable for publication on the web page article.

In an exemplary embodiment in which a probability value is used as an indication that the content of the advertisement falls into an unsuitable category, the higher the probability value, the higher is the likelihood that the advertisement is unsuitable for publication on the web page article. Similarly, in an exemplary embodiment in which a probability value is used as an indication that the content of the advertisement does not fall into an unsuitable category, the higher the probability value, the higher is the likelihood that the advertisement is not unsuitable for publication on a web page associated with the web page article.

In the exemplary embodiment illustrated in FIG. 2, the indication is a probability value indicating the likelihood that the content of the advertisement falls into a particular category that may be unsuitable for publication on a web page associated with a particular web page article or unsuitable for publication on a web page associated with any web page article on a particular website. That is, the higher the probability value, the higher is the likelihood that the advertisement is unsuitable for publication on a web page associated with the web page article.

In an exemplary embodiment in which the content of the advertisement is categorized based on a single unsuitable category, the advertisement has a single associated probability value for the unsuitable category. For example, the advertisement may have an associated probability value for the "scary" category of 0.3. In another exemplary embodiment in which the content of the advertisement is categorized based on two or more unsuitable categories, the advertisement has an associated probability value for each unsuitable category. For example, the advertisement may have an associated probability value for the "scary" category of about 0.5 and an associated probability value for the "salacious" category of about 0.0.

In step 204, exemplary embodiments may receive or generate one or more threshold values associated with each unsuitable category. The threshold values may be used to automatically determine if the probability value associated with the advertisement is sufficiently high to warrant automatic exclusion of the advertisement from publication on a web page associated with the web page article, and/or to determine if the probability value associated with the advertisement is sufficiently low to warrant automatic publication of the advertisement on a web page associated with the web page article. In an exemplary embodiment, the threshold values may be predefined values associated with the unsuitable category for advertisements. In an exemplary embodiment, the threshold values may be determined based on an analysis of the distribution of advertisements in a reference corpus over varying threshold values.

For example, if it is determined that, among a plurality of advertisement examples in the reference corpus, all of the examples having probability values below a particular threshold value were not in the unsuitable category, then that threshold value may be used as a first lower threshold value in exemplary embodiments. Similarly, if it is determined that, among a plurality of advertisement examples in the reference corpus, all of the examples having probability values above a particular threshold value were in the unsuitable category, then that threshold value may be used as a second higher threshold value in exemplary embodiments. The second higher threshold value may indicate a probability value at or above which an advertisement is likely to fall into the unsuitable category and, therefore, is likely to be unsuitable for publication on a web page associated with the web page article. The first lower threshold value may indicate a probability value at or below which an advertisement is unlikely to fall into the unsuitable category and, therefore, is unlikely to be unsuitable for publication on a web page associated with the web page article.

In an exemplary embodiment, the one or more threshold values may be set to the same value over all of the unsuitable categories. In another exemplary embodiment, the threshold values may set to different values for different unsuitable categories, for example, the threshold values may be lower for a category like "salacious" and higher for a category like "scary."

Exemplary embodiments may compare the probability values associated with the advertisement falling into one or more unsuitable categories—against the threshold values associated with the unsuitable categories. In an exemplary embodiment, a lower first threshold value and a lower second threshold value may be used for each unsuitable category. In this exemplary embodiment, in step 206, exemplary embodiments may determine if the probability values associated with the advertisement for one or more unsuitable categories are all lower than the first lower threshold values associated with the unsuitable categories. Alternatively, exemplary embodiments may determine if the probability values associated with the advertisement for one or more unsuitable categories are all equal to or lower than the first lower threshold values associated with the unsuitable categories.

In an exemplary embodiment in which a single unsuitable category is used, the advertisement has a single probability value associated with that unsuitable category (for example, that the advertisement has a probability value of 0.45 of falling in the "scary" category). In this exemplary embodiment, step 106 compares the single probability value with the first lower threshold value associated with the single unsuitable category (for example, compares 0.45 with a first lower threshold value of 0.4 for the "scary" category). A single probability value associated with the unsuitable category that is lower than the first lower threshold value associated with the unsuitable category indicates that it is likely that the advertisement may not be unsuitable for publication on a web page associated with the web page article, and that the advertisement may be automatically published on a web page associated with the web page article (by taking the "Yes" branch). In this case, exemplary embodiments may automatically publish the advertisement on a web page associated with a particular set of one or more web page articles, or automatically publish the advertisement on a web page associated with any or all web page articles on a website. Otherwise, the advertisement is not suitable for automatic publication on a web page associated with the web page article, and the "No" branch is taken.

In another exemplary embodiment in which two or more unsuitable categories are used, the advertisement has two or more associated probability values, each probability value associated with one of the unsuitable categories (for example, that the advertisement has a probability value of 0.3 of falling into the "scary" category and a probability value of 0.1 of falling into the "salacious" category). In this exemplary embodiment, step 206 compares the probability value associated with each unsuitable category with the first lower threshold value associated with that particular unsuitable category (for example, compares 0.3 with a first lower threshold value of 0.2 for the "scary" category, and compares 0.1 with a first lower threshold value of 0.3 for the "salacious" category).

If the probability value for each unsuitable category is lower than the first lower threshold value of that unsuitable category, this indicates that it is likely that the advertisement is not unsuitable for publication on a web page associated with the web page article, and that the advertisement may be automatically published on a web page associated with the web page article (by taking the "Yes" branch). That is, the probability values for all of the unsuitable categories must meet the lower-than-first-threshold requirement for automatic publication of the advertising on a web page associated with the web page article. Exemplary embodiments may automatically publish the advertisement on a web page associated with a particular set of one or more web page articles. In another exemplary embodiment, exemplary embodiments may automatically publish the advertisement on a web page associated with any or all web page articles on a website. Otherwise, the advertisement is not suitable for automatic publication on a web page associated with the web page article, and the "No" branch is taken.

In an exemplary embodiment, the decision on whether to automatically publish the advertisement on a web page associated with a particular web page article may be based on whether the advertisement is a negative example of an unsuitable category. In another exemplary embodiment, the decision on whether to automatically publish the advertisement on a web page associated with a particular web page article may be based on whether the advertisement is a negative example of an unsuitable category and also on a category of the web page article. The category of the web page article may be determined by an exemplary machine learning system implementing a machine learning and boosting algorithm encoded on one or more computer-readable media.

In step 208, one or more actions associated with the automatic publication of the advertisement associated with the web page article may be performed. The one or more actions may include, but are not limited to, automatically publishing the advertisement on a web page associated with the web page article, scheduling automatic publication of the advertisement on a web page associated with the web page article, designating the advertisement for automatic publication on a web page associated with the web page article, and the like.

Returning to step 206, if the "No" branch is taken, this indicates that there is a sufficient likelihood that the advertisement is a positive example of a category that may be unsuitable for publication on a web page associated with the web page article. In this exemplary embodiment, in step 210, exemplary embodiments may determine if the probability values associated with the advertisement for one or more unsuitable categories are higher than the second higher threshold values associated with the unsuitable categories. Alternatively, exemplary embodiments may determine if the probability values associated with the advertisement for one or more unsuitable categories are equal to or higher than the second higher threshold values associated with the unsuitable categories.

In an exemplary embodiment in which a single unsuitable category is used, the advertisement has a single probability value associated with that unsuitable category (for example, that the advertisement has a probability value of 0.45 of falling in the "scary" category). In this exemplary embodiment, step 210 compares the single probability value with the second higher threshold value associated with the single unsuitable category (for example, compares 0.45 with a second higher threshold value of 0.9 for the "scary" category).

A probability value associated with the unsuitable category that is higher than the second higher threshold value associated with the unsuitable category indicates that it is likely that the advertisement may be unsuitable for publication on a web page associated with the web page article, and that the advertisement may be automatically excluded from publication on a web page associated with the web page article (by taking the "Yes" branch). In this case, exemplary embodiments may automatically exclude the advertisement from publication on a web page associated with a particular set of one or more web page articles, and/or automatically exclude the advertisement from publication on a web page associated with any or all web page articles on a website. Otherwise, the advertisement may require review, for example, by a human reviewer. In this case, the "No" branch is taken.

In another exemplary embodiment in which two or more unsuitable categories are used, the advertisement has two or more associated probability values, each probability value associated with one of the unsuitable categories (for example, that the advertisement has a probability value of 0.3 of falling into the "scary" category and a probability value of 0.1 of falling into the "salacious" category). In this exemplary embodiment, step 210 compares the probability value associated with each unsuitable category with the second higher threshold value associated with that particular unsuitable category (for example, compares 0.3 with a second higher threshold value of 0.75 for the "scary" category, and compares 0.1 with a second higher threshold value of 0.8 for the "salacious" category).

If the probability value associated with any unsuitable category is higher than the second higher threshold value of that unsuitable category, this indicates that it is likely that the advertisement is unsuitable for publication on a web page associated with the web page article, and that the advertisement may be automatically excluded from publication on a web page associated with the web page article (by taking the "Yes" branch). That is, the advertisement may be automatically excluded from publication on a web page associated with the web page article if the probability value for any of the unsuitable categories meets the higher-than-second-threshold requirement. Exemplary embodiments may automatically exclude the advertisement from publication on a web page associated with a particular set of one or more web page articles. Further, exemplary embodiments may automatically exclude the advertisement from publication on a web page associated with any or all web page articles on a website. Otherwise, the advertisement may require review, for example, by a human reviewer. In this case, the "No" branch is taken.

In an exemplary embodiment, the decision on whether to automatically exclude the advertisement from publication on a web page associated with a particular web page article may be based on whether the advertisement is a positive example of an unsuitable category. In another exemplary embodiment, the decision on whether to automatically exclude the advertisement from publication on a web page associated with a particular web page article may be based on whether the advertisement is a positive example of an unsuitable category and also on a category of the web page article. For example, a certain category of advertisement may be suitable for publication only on certain categories of web page articles. The category of the web page article may be determined by an exemplary machine learning system implementing a machine learning and boosting algorithm encoded on one or more computer-readable media.

In step 212, one or more actions associated with the automatic exclusion of the advertisement from publication on a web page associated with the web page article may be performed. The one or more actions may include, but are not limited to, automatically publishing the web page article without the advertisement, automatically designating the web page article as being unsuitable for accompaniment with the advertisement, automatically designating the advertisement as being unsuitable for publication on a web page associated with the web page article, automatically scheduling the web page article for publication without the advertisement, and the like.

Returning to step 210, if the "No" branch is taken, this indicates that it is unclear if the advertisement is suitable or unsuitable for publication on a web page associated with the web page article. In step 214, exemplary embodiments may send the textual content of the advertisement along with the associated probability value or score to a human reviewer who may review the advertisement and decide whether to publish the advertisement on a web page associated with the web page article.

In exemplary embodiments, the advertisement categories suitable for publication on a web page associated with a web page article may be determined based on the content of the web page article, for example, based on one or more categories that may be used to classify the web page article content. Exemplary embodiments may provide one or more databases mapping one or more web page article categories to one or more associated advertising categories, where a web page article with content falling into a particular web page article category may be accompanied by one or more advertisements falling into the one or more associated advertising categories. As an example, a web page article with content falling in the web page article category of "travel" (for example, a travel blog post) may be accompanied by one or more advertisements falling into associated exemplary advertising categories of "transportation," "hotel," "vacation deal," "travel agency," and the like. As another example, a web page article with content falling in the web page article categories of "travel" and "insurance" (for example, a news article on a cruise ship accident) may be accompanied by one or more advertisements falling into the associated exemplary advertising category of "travel insurance."

Figure 3:
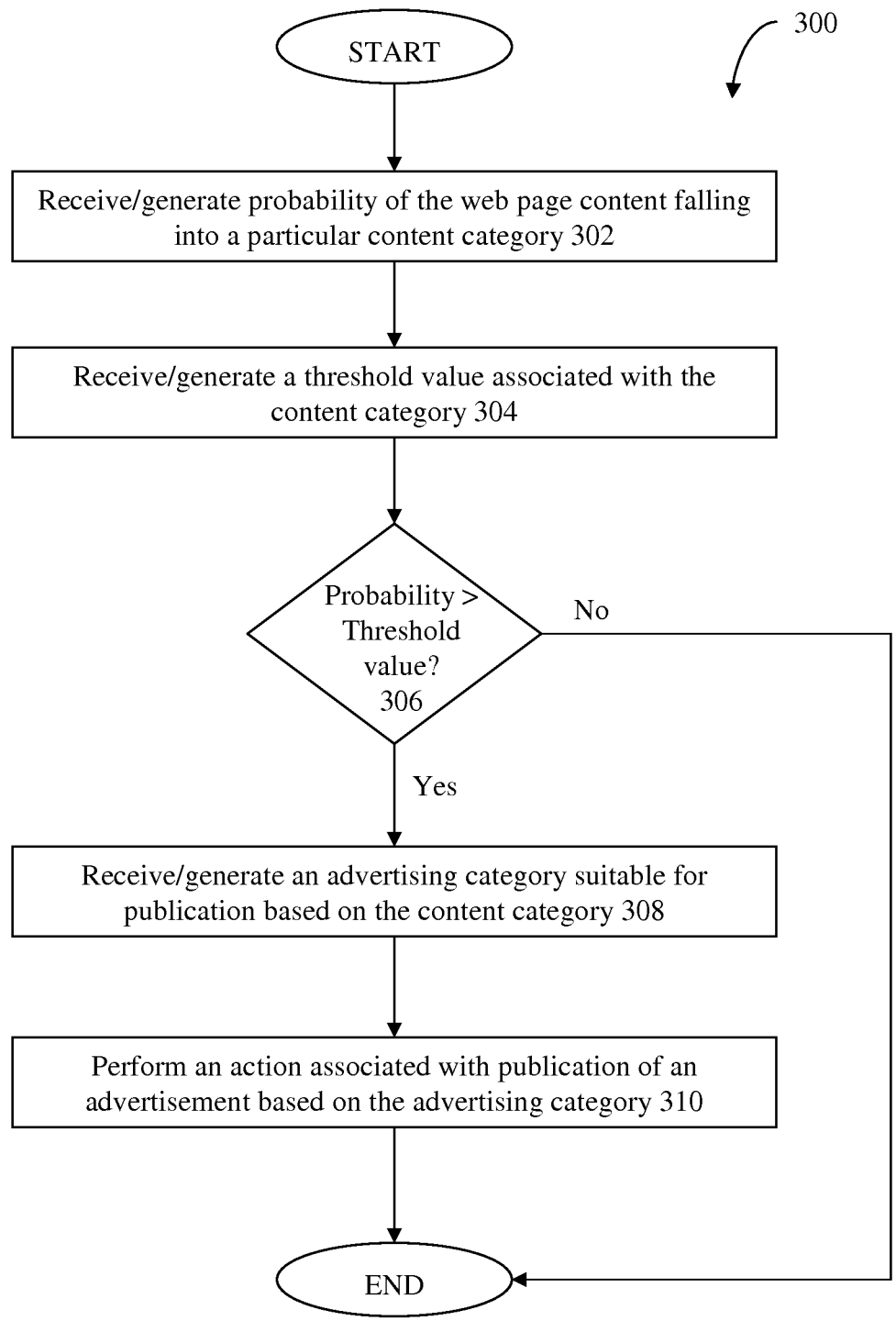
FIG. 3 is a flowchart illustrating an exemplary computer-implemented and computer-executable method that may be used to determine an advertisement category that is suitable for publication on a web page associated with a web page article based on a textual category used to classify the web page article.

FIG. 3 is a flowchart illustrating an exemplary computer-implemented and computer-executable method 300 that may be used to determine whether an advertisement category that is suitable for publication on a web page associated with a web page article based on a textual category used to classify the web page article. In step 302, exemplary embodiments may receive an indication of whether part or the entire textual content of the web page article falls into one or more predefined web page article categories. Alternatively, in step 302, exemplary embodiments may receive and analyze part or the entire textual content of the web page article to generate an indication of whether the web page article falls into the one or more predefined content categories. Exemplary indications may take any form suitable for use in method 300 including, but not limited to, a quantitative indication (for example, a probability) that the web page article falls into a predefined web page article category. In this exemplary embodiment, the higher the probability value, the higher is the likelihood that the web page article falls into the predefined web page article category. Exemplary web page article categories may include, but are not limited to, travel, politics, accident, and the like. The one or more web page article categories may be used to determine one or more associated advertising categories that are suitable for publication on a web page associated with the web page article.

In step 304, exemplary embodiments may receive or generate one or more threshold values associated with the probability values associated with the one or more web page article categories. Each threshold value may be a predefined stored value associated with a single web page article category, and may be used to determine if the probability value for the category is sufficiently high to safely assume that the web page article is a positive example of the category. In an exemplary embodiment, the threshold values may be constant over all web page article categories. In another exemplary embodiment, the threshold values may vary over different web page article categories.

In step 306, exemplary embodiments may compare the probability of the web page article falling into each of the web page article categories with associated threshold values. The threshold value for a web page article category may indicate a probability value at and/or above which the web page article is very likely to fall into the associated web page article category. Exemplary embodiments may retain only those web page article categories that have a probability value above the associated threshold value. For example, exemplary embodiments may compare the probability (for example, 70%) of the web page article content falling into the category of "accident" with an associated threshold value (for example, 80%) for the "accident" category, and may compare the probability (for example, 85%) of the web page article falling into the category of "politics" with an associated threshold value (for example, 70%) for the "politics" category. In this example, exemplary embodiments would not retain the "accident" category but would retain the "politics" category. Step 306 may be repeated until all of the web page article categories associated with the web page article have been compared against their associated threshold values.

In step 308, exemplary embodiments may use the set of web page article categories applicable to the web page article to receive or generate one or more positive advertising categories that may be suitable for publication on a web page associated with the web page article. Exemplary embodiments may use the set of web page article categories to determine one or more negative advertising categories that may be unsuitable for publication on a web page associated with the web page article.

Exemplary embodiments may consult one or more databases mapping web page article categories to associated positive and/or negative advertising categories. Additionally, exemplary embodiments may use a rule-based system to determine one or more positive and/or negative advertising categories based on the web page article categories. For example, exemplary embodiments may provide and utilize one or more rules, with each rule mapping one or more web page article categories to one or more advertising categories suitable for publication on a web page associated with the web page article and, in some instances, mapping one or more web page article categories to one or more advertising categories unsuitable for publication on a web page associated with the web page article. Some exemplary rules are provided below for illustrative purposes. One of ordinary skill in the art will recognize that exemplary rules are not limited to the illustrated examples provided below, and that any suitable rules may be used in accordance with exemplary embodiments.

---

Exemplary rules for determining an advertisement category
    Web page article category ("travel") –> Advertising category ("transportation," "hotel," "vacation deal," "travel agency")
    Web page article category ("travel" and "accident") –> Advertising category ("travel insurance," not "transportation," not "vacation deal," not "travel agency")
    Web page article category ("accident") –> Advertising category ("life insurance")
    Web page article category ("politics") –> Advertising category ("all")
    Web page article category ("scary" or "salacious") –> Advertising category ("none")

---

In step 310, exemplary embodiments may perform one or more actions associated with the publication of one or more advertisements on a web page associated with the web page article including, but not limited to, automatically publish or schedule for publication one or more advertisements falling into one or more of the positive advertising categories on a web page associated with the web page article, automatically exclude or schedule exclusion from publication on a web page associated with the web page article those advertisements that fall into one or more of the negative advertising categories, designate the web page article for publication with one or more advertisements in one or more of the positive advertising categories, designate the web page article for publication without advertisements in one or more of the negative advertising categories, and the like.

Figure 4:
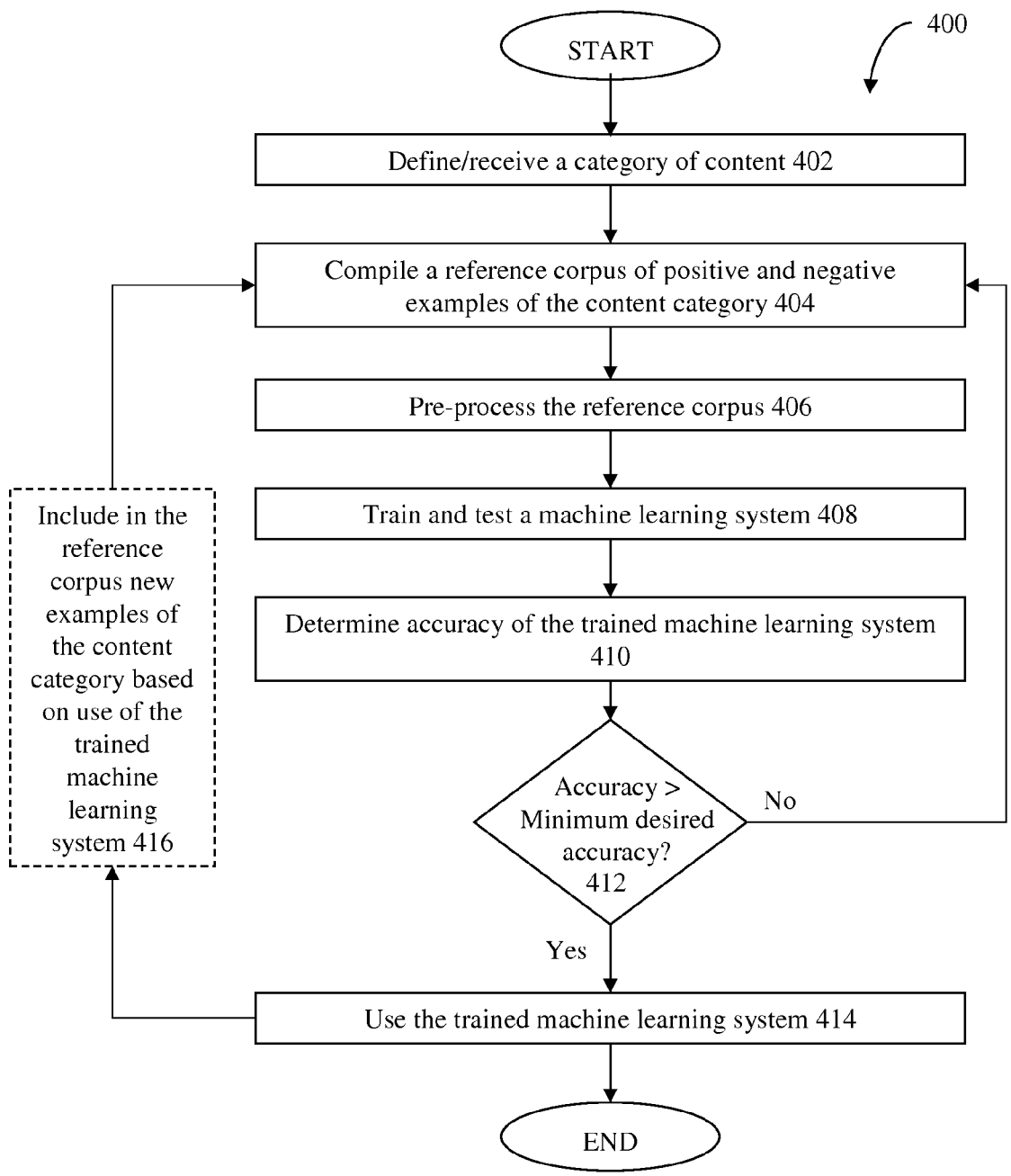
FIG. 4 is a flowchart illustrating an exemplary general computer-implemented and computer-executable method for training, testing and using an exemplary machine learning system implementing a machine learning algorithm embodied on one or more computer-readable media.

FIG. 4 is a flowchart illustrating an exemplary general computer-implemented and computer-executable method 400 for training, testing and using an exemplary machine learning system implementing an exemplary machine learning algorithm encoded on one or more computer-readable media. In step 402, exemplary embodiments may define or receive one or more categories to be used in analyzing textual content. In exemplary embodiments, a category may be binary, i.e., content may be either a positive example of the category or a negative example of the category. For example, for the binary category "scary," any particular piece of text may be categorized only as a positive example of the category (i.e., scary) or as a negative example of the category (i.e., not scary). Examples of binary categories include, but are not limited to, scary, salacious, and the like.

In step 404, a reference corpus may be compiled for each category to contain verified positive and negative content examples of the category. The verification may be performed by a human reviewer. Alternatively, a reference corpus may be provided.

Figure 5:
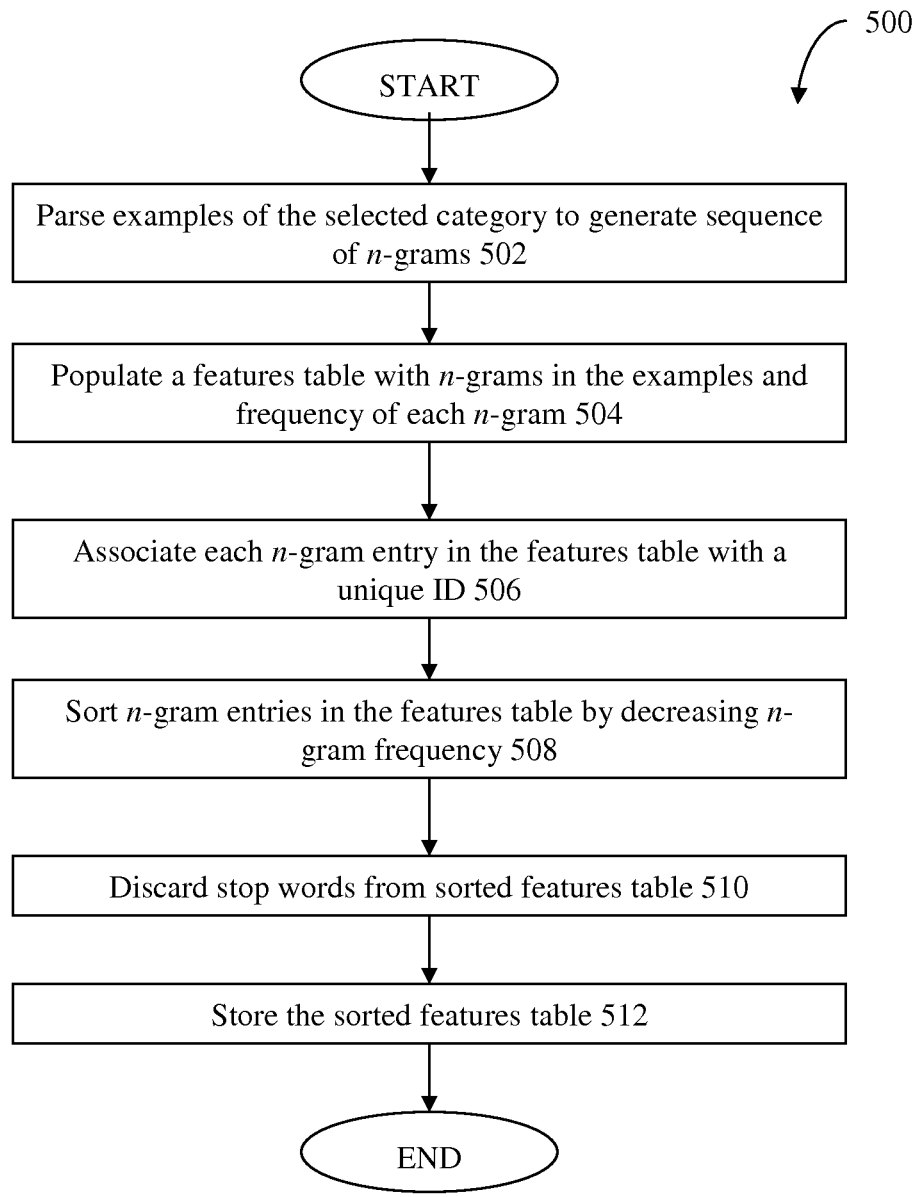
FIG. 5 is a flowchart illustrating an exemplary computer-implemented and computer-executable method for pre-processing examples in a reference corpus before generation of training or testing vectors based on the examples.

In step 406, the reference corpora for all of the categories may be pre-processed to facilitate the creation of training and test vectors for training and testing an exemplary machine learning system implementing an exemplary machine learning algorithm encoded on one or more computer-readable media. An exemplary method 500 for pre-processing the reference corpora is illustrated in FIG. 5 and described in more detail in connection with FIG. 5.

Figure 7:
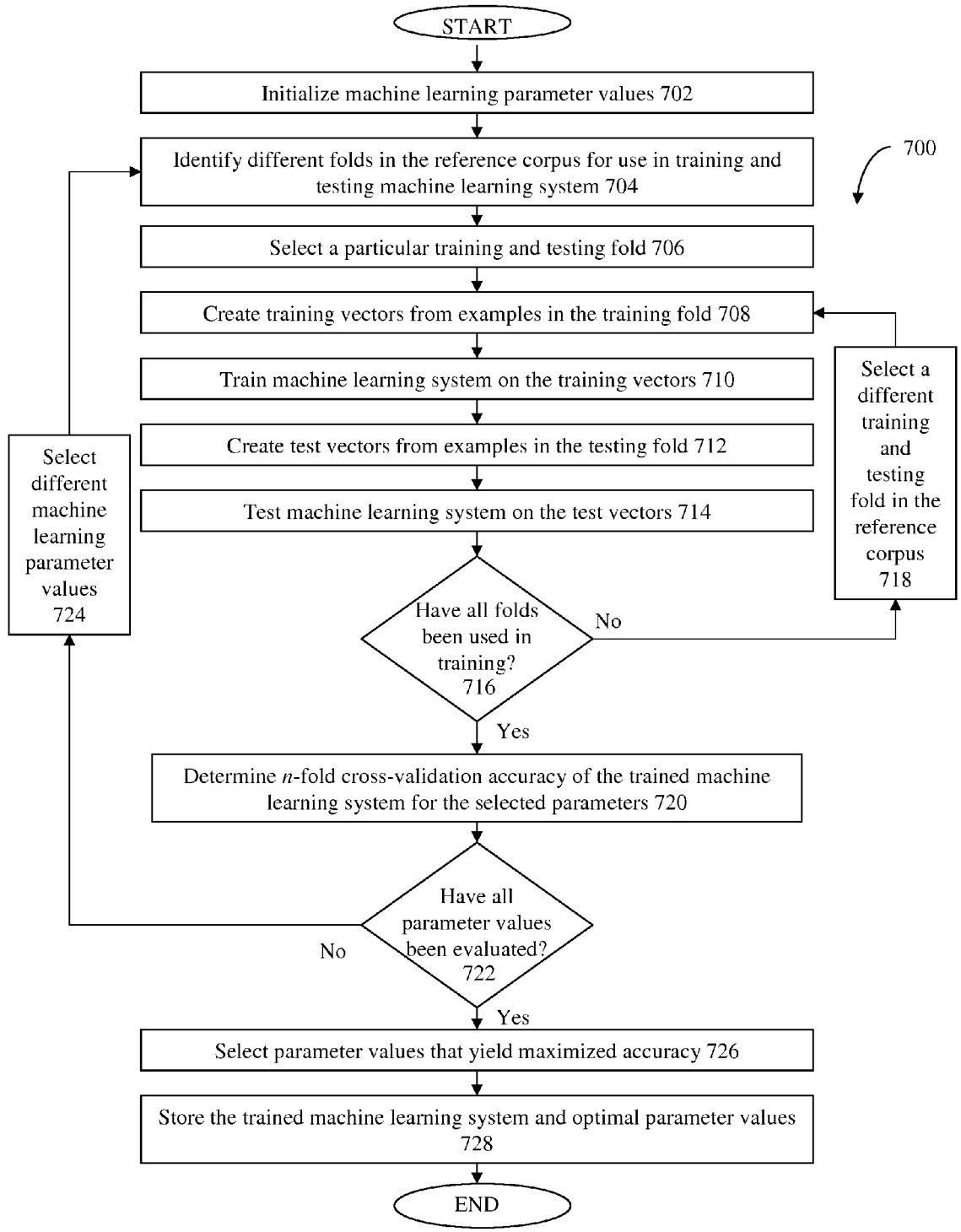
FIG. 7 is a flowchart illustrating an exemplary computer-implemented and computer-executable method for training and testing an exemplary machine learning system implementing a machine learning algorithm embodied on one or more computer-readable media to automatically assess the likelihood of the textual content of a web page article or an advertisement falling into a selected category.

In step 408, an exemplary machine learning system may be trained and tested using examples in the pre-processed reference corpora so that the trained machine learning system may automatically assess whether a particular piece of text falls into one or more categories associated with the reference corpora. An exemplary method 700 for training and testing an exemplary machine learning system is illustrated in FIG. 7 and described in more detail in connection with FIG. 7.

In step 410, upon testing of the trained machine learning system, exemplary embodiments may determine the accuracy with which the trained machine learning system determines whether a particular piece of text falls into the categories.

In step 412, exemplary embodiments may determine if the accuracy value achieved by the machine learning system is above a predefined threshold accuracy value. The threshold accuracy value may be an accuracy value at and/or above which the machine learning system is considered sufficiently accurate. Exemplary threshold accuracy values in exemplary embodiments may range from about 80% to about 100%, but are not limited to this exemplary range. If the trained machine learning system has achieved a sufficient level of accuracy, then the machine learning system is considered sufficiently trained and the "Yes" branch may be taken.

Figure 15:
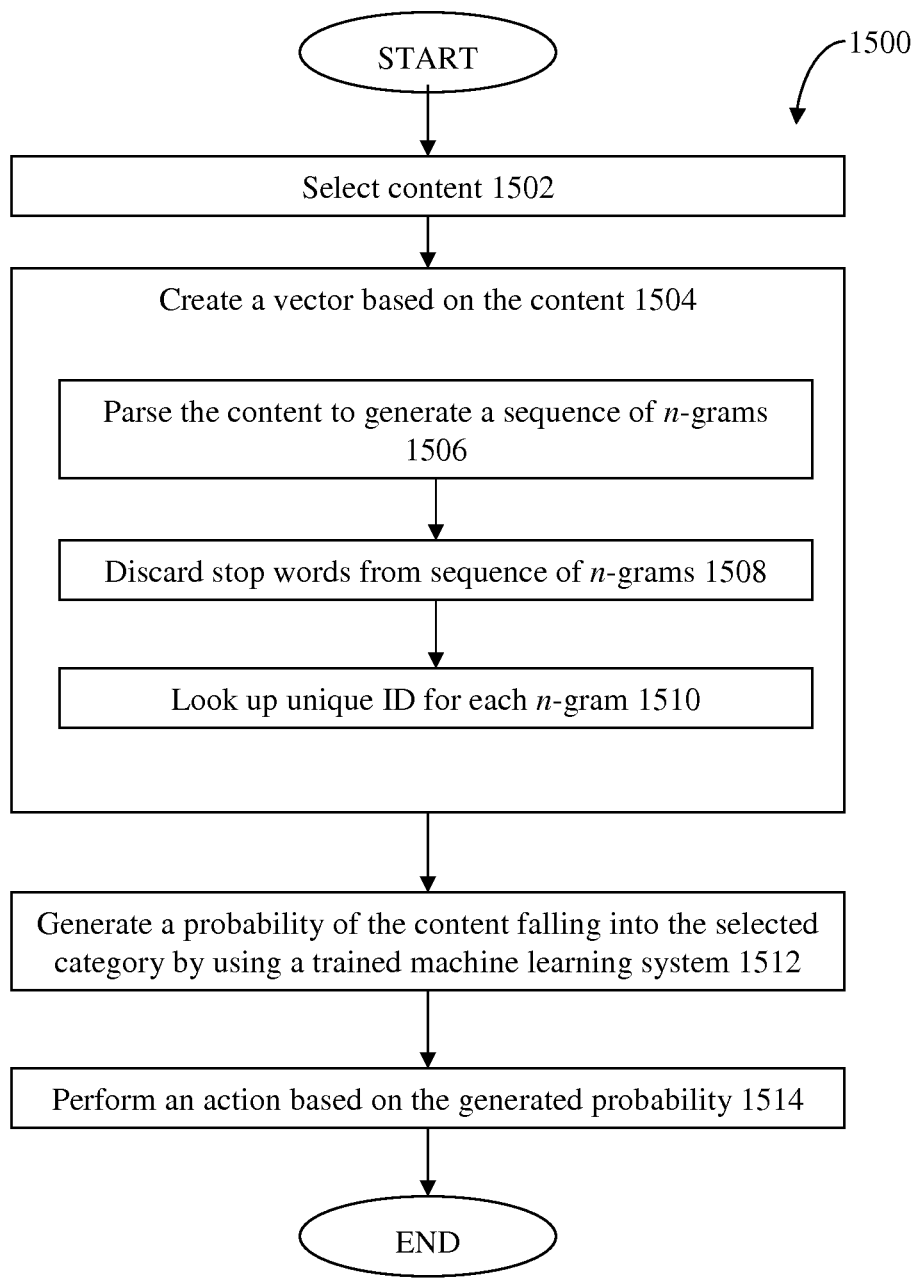
FIG. 15 is a flowchart illustrating an exemplary computer-implemented and computer-executable method for categorizing the textual content of a web page article or an advertisement.

In step 414, the trained and tested machine learning system may be used to publish and/or to manage publication of advertisements on a web page associated with web page articles, for example, in a real-time environment. An exemplary method 1500 for using an exemplary trained machine learning system is illustrated in FIG. 15 and described in more detail in connection with FIG. 15.

During use, the machine learning system may encounter examples of textual content that are not present in the reference corpora. In step 416, the new examples may be included in the reference corpora and used in retraining of the machine learning system. In exemplary embodiments, the machine learning system may be retrained at any suitable time to improve its accuracy.

Returning to step 412, if the machine learning system has not achieved a sufficient accuracy, then the "No" branch is taken and further training is performed on the machine learning system. In an exemplary embodiment, before further training is performed, the reference corpora may be enriched with more examples in step 404 to improve the accuracy of the trained system. In another exemplary embodiment, the reference corpora may not be further enriched before further training takes place.

Exemplary Pre-Processing of Examples in Reference Corpus

FIG. 5 is a flowchart illustrating an exemplary computer-implemented and computer-executable method 500 for pre-processing examples in a reference corpus before generation of training or testing vectors based on the examples. In step 502, the text of each positive and negative example in the reference corpus is parsed to generate a sequence of n-grams and the frequency with which each n-gram appears in each example.

In step 504, a features table is generated or updated to include n-grams and associated n-gram frequencies for examples in the reference corpus. If the same n-gram appears in two or more examples, the same n-gram is not entered multiple times in the features table, but rather the frequency of the same n-gram entry is updated based on its recurrence.

In step 506, each unique n-gram entry in the features table is provided with a unique identifier (ID). The unique ID may be generated automatically or by a user. The unique ID may be generated randomly or may be associated indirectly to the n-gram.

In step 508, the n-gram entries in the features table are sorted by decreasing n-gram frequency.

In step 510, in an exemplary embodiment, one or more stop words may discarded from the sorted features table. Stop words are commonly used terms and tend to appear at the top of the sorted features table due to their relatively high frequencies. In the exemplary embodiment illustrated in FIG. 5, stop words may be discarded after the n-grams are generated. In another exemplary embodiment, stop words may be discarded before the n-grams are generated. In another exemplary embodiment, stop words may be retained in the pre-processing of the examples in the reference table.

In an exemplary embodiment, certain non-word textual features that are predictive of categories may be retained. Examples of these textual features include, but are not limited to, capitalization, question marks, exclamation points, and the like.

In step 512, the sorted features table is stored on a storage device. The sorted features table is used in generating training vectors for training an exemplary machine learning system and in generating test vectors for testing a machine learning system.

Figure 6A:
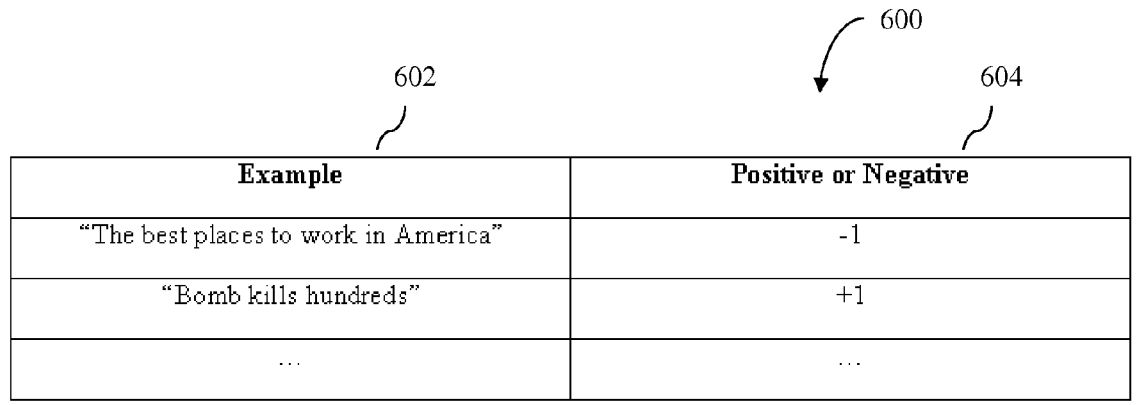
FIG. 6A is a diagram showing an exemplary reference corpus processed by exemplary embodiments.

FIG. 6A is a pictorial representation of an exemplary reference corpus 600 for the category "scary." The reference corpus 600 includes a collection of positive and negative examples 602 of the category "scary" and, for each example, an indication 604 of whether the example is a positive example or a negative example of the category "scary." Each example in column 602 may be parsed into a sequence of constituent n-grams. In this example, unigrams and bigrams are used. In other exemplary embodiments, trigrams and/or other n-grams may also be used. Each n-gram in each example is determined to have a frequency of one in the illustrative example. The n-gram features and their associated frequencies are entered into a features table 650 which may be stored in a database. The exemplary reference corpus 600 of FIG. 6A is merely illustrative, and any suitable storage structure may be used to store the examples of a category.

Figure 6B:
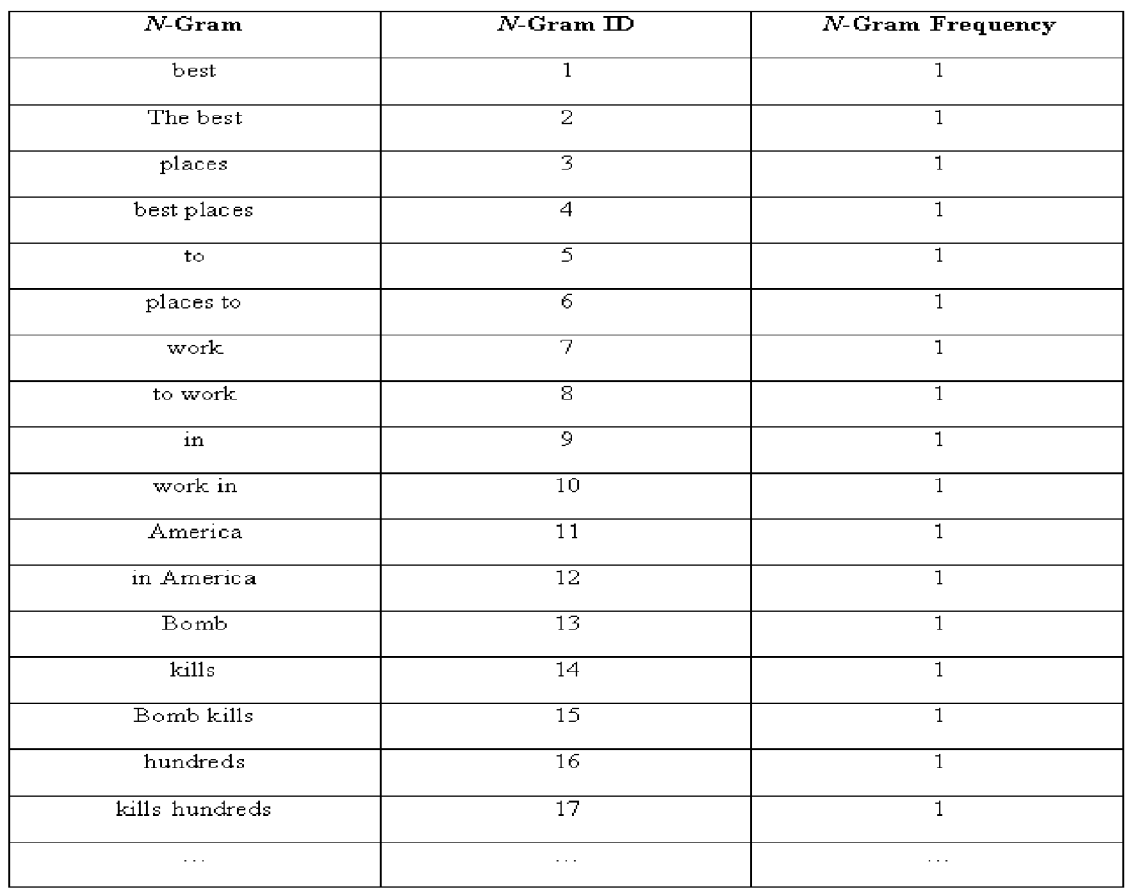
FIG. 6B is a diagram showing an exemplary features table formed by pre-processing the exemplary reference corpus of FIG. 6A.

FIG. 6B is a pictorial representation of an exemplary features table 650 corresponding to the reference corpus 600. An exemplary features table 650 may have a column 654 for unique IDs associated with n-gram entries, a column 652 for unique n-grams, and a column 656 for n-gram frequencies. Each n-gram is given a unique ID that is stored in the column 652 of the features table 650. The n-gram entries in the features table 650 are then sorted by decreasing n-gram frequency in the column 656 of the features table 650. Entries with stop words as n-grams are discarded from the features table 650 after generation of the n-grams in an exemplary embodiment. The exemplary features table 650 of FIG. 6B is merely illustrative, and any suitable storage structure may be used to store the n-grams, their associated frequencies and their corresponding unique IDs.

Exemplary Training and Testing of Exemplary Machine Learning Systems

After pre-processing of the examples in the reference corpus for a selected category, an exemplary machine learning system may be trained and tested using examples in the reference corpus so that the trained system is able to automatically assess the likelihood of a particular piece of text falling into the selected category. The exemplary machine learning system may employ a weak learner that follows a set of rules to classify any given piece of text into a positive or a negative example of the selected category. The exemplary machine learning system may also employ a boosting algorithm for improving the accuracy of the weak learner.

Exemplary machine learning systems may employ any suitable weak learner that can classify a piece of text into a positive or a negative example of the selected category. The weak learner may implement one or more suitable techniques including, but not limited to, decision trees, neural networks, hidden Markov models, nearest neighbor classifiers, simple rules of thumb, and the like.

In an exemplary embodiment, the weak learner may classify a piece of text based on the existence of one or more pre-defined features in the text, for example, the feature "accident." The pre-defined features may be associated with positive or negative examples of a selected category. For example, "accident" may be associated with the category "scary." The existence of the features in the piece of text may be used by the weak learner to classify the piece of text as a positive example or a negative example of the selected category.

Exemplary machine learning systems may employ any suitable boosting algorithm including, but not limited to, the AdaBoost, icsiboost, textbooster, linsvm algorithms. An exemplary boosting algorithm, that may be used in accordance with exemplary embodiments, calls the weak learner repeatedly on a set of training examples in a series of rounds. Before each round, a distribution of weights over the training examples is updated to indicate the importance of certain examples. For example, the weights of incorrectly classified examples are increased and the weights of correctly classified examples are decreased. The adjustment of the weight distribution allows the weak learner to focus on the incorrectly classified examples in subsequent rounds.

FIG. 7 is a flowchart illustrating an exemplary computer-implemented and computer-executable method 700 for training and testing an exemplary machine learning system to automatically assess the likelihood of a particular piece of text falling into a selected category. One or more parameters may be used in training and testing the machine learning system. Exemplary parameters include, but are not limited to, the weak learner used to classify text as positive or negative examples of the selected category, the number of rounds used in the boosting algorithm, and the like. In step 702, a set of one or more parameter values used in training and testing the exemplary machine learning system are initialized. The initial parameter values may be predefined. Alternatively, in an exemplary embodiment, the parameter values may already be initialized and step 702 may be skipped.

In step 704, different folds are identified in the reference corpus for use in training and testing the machine learning system. Alternatively, different folds may already be initialized and step 704 may be skipped. Training and testing is performed on each of the different folds.

Figure 8A:
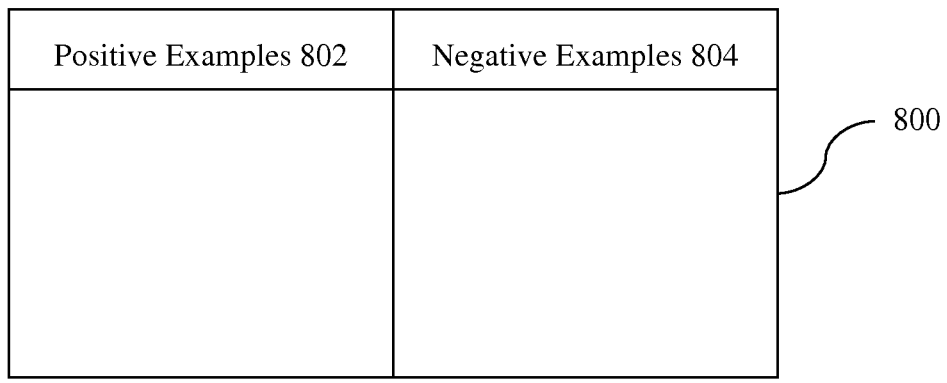
FIG. 8A is a diagram showing an exemplary reference corpus including positive and negative examples of a selected category.
Figure 8B:
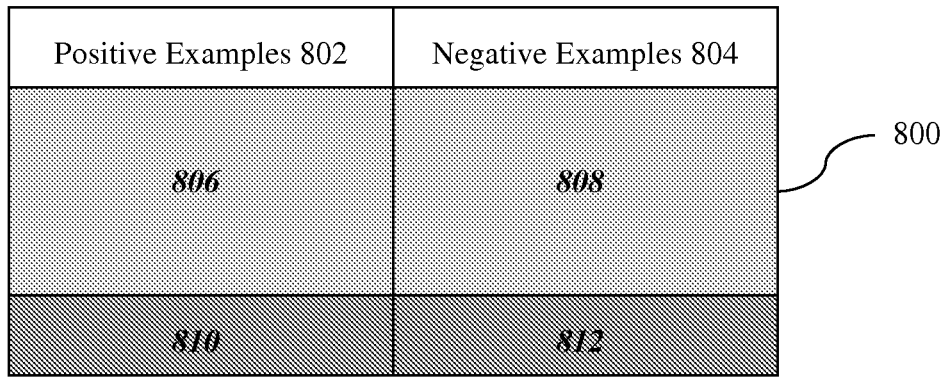
FIG. 8B is a diagram showing the exemplary reference corpus of FIG. 8A, in which certain positive and negative examples are selected for training an exemplary machine learning system implementing a machine learning algorithm embodied on one or more computer-readable media and other positive and negative examples are selected for testing the machine learning system implementing a machine learning algorithm embodied on one or more computer-readable media.
Figure 8C:
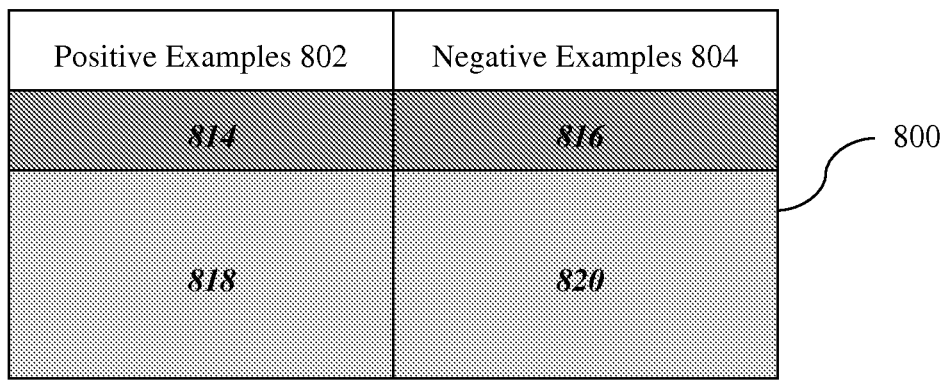
FIG. 8C is a diagram showing the exemplary reference corpus of FIG. 8A, wherein positive and negative examples are selected for training an exemplary machine learning system implementing a machine learning algorithm embodied on one or more computer-readable media and other positive and negative examples are selected for testing the machine learning system implementing a machine learning algorithm embodied on one or more computer-readable media.

In step 706, a particular training and testing fold is selected in the reference corpus from the identified folds, for example, the fold identified in FIG. 8B or the fold identified in FIG. 8C. Training examples present in the selected fold are used to train the machine learning system, and test examples present in the selected fold are used to test the machine learning system.

In an exemplary embodiment, the machine learning system accepts as training input a set of training vectors generated from the training examples. In step 708, training vectors may be generated based on the training examples present in the selected fold.

In step 710, the machine learning system is trained on the training vectors.

In an exemplary embodiment, the machine learning system accepts as test input a set of test vectors generated from the test examples. In step 712, test vectors may be generated based on test examples present in the selected fold.

In step 714, the trained machine learning system is tested on the test vectors.

In step 716, in an exemplary embodiment, it is determined if all of the identified folds have been used in training and testing the machine learning system. If all of the identified folds have not been used, the "No" branch is taken and a different training and testing fold is selected in the reference corpus in step 718. Subsequently, the method returns to step 708.

Returning to step 716, if all of the identified folds have been used, the "Yes" branch is taken and, in step 720, exemplary embodiments determine the n-fold cross-validation accuracy with which the trained machine learning system categorizes test examples among the different folds as positive and negative examples of the selected category. For example, if the machine learning system correctly categorizes all of the test examples that are abusive as being positive examples of the category "scary," then the accuracy is determined to be 100%. Similarly, if the machine learning system incorrectly categorizes all of the test examples that are abusive as being negative examples of the category "scary," then the accuracy is determined to be 0%.

In step 722, it is determined if all desired parameter values have been used in training and testing the machine learning system. If all desired parameter values have not been used, the "No" branch is taken and, in step 724, a set of one or more different parameter values is selected and the method returns to step 704.

Returning to step 722, if all desired, parameter values have been used, the "Yes" branch is taken and the method proceeds to step 726.

In an exemplary embodiment, for each parameter, method 700 trains and tests the machine learning system over a plurality of parameter values. For each parameter value tested, method 700 determines the accuracy of the machine learning system. In step 726, exemplary embodiments assess the change in the accuracy over different values for each parameter. For example, exemplary embodiments may generate a graph of the accuracy (y-axis) against different parameter values (x-axis) for each parameter. Based on the assessment, exemplary embodiments may select a parameter value for each parameter at which one or more performance characteristics of the machine learning system are maximized. The performance characteristics may include, but are not limited to, the accuracy of categorization performed by the machine learning system, the speed of operation of the machine learning system, and the like.

Figure 9:
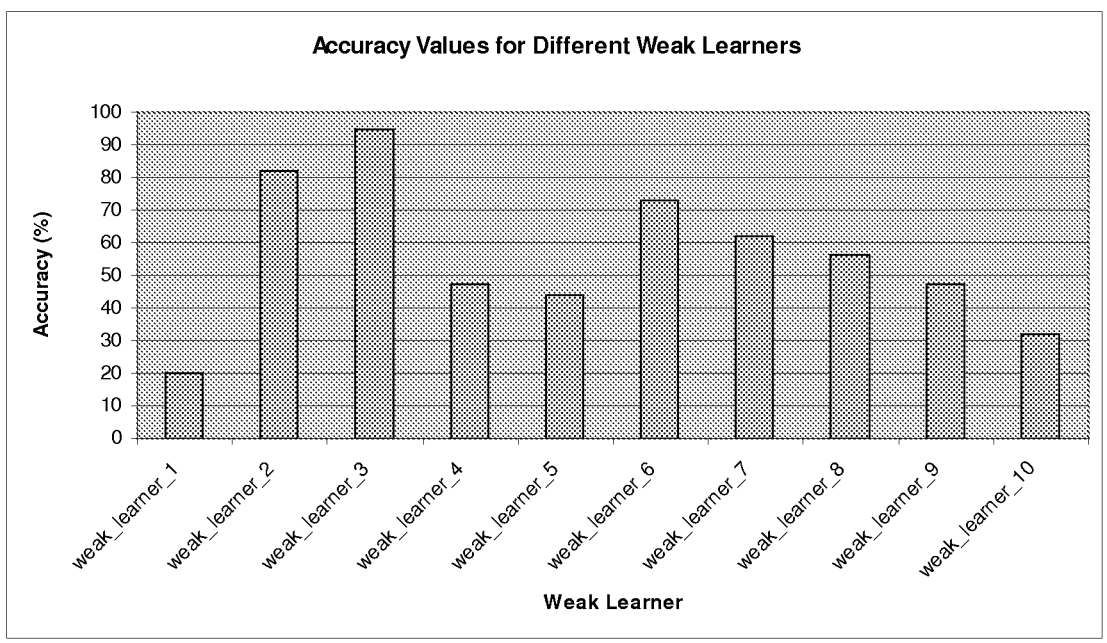
FIG. 9 is a histogram of exemplary accuracy values achieved by different trained weak learners.

In an exemplary embodiment, parameter values may be selected to maximize the accuracy of the machine learning system. This results in the generation of a set of parameter values, corresponding to a set of parameters, at which the accuracy of the machine learning system is maximized. Reference is made to FIG. 9, which is a histogram of accuracy values (y-axis) achieved by different exemplary weak learners used (x-axis), of which "weak_learner_3" is selected in an exemplary embodiment in order to maximize accuracy.

In step 728, exemplary embodiments may store, on a storage device, the trained machine learning system and the set of parameter values at which the accuracy of the machine learning system is maximized.

FIGS. 8A-8C illustrate the identification of different folds in an exemplary reference corpus 800. FIG. 8A is a diagram illustrating an exemplary reference corpus 800 of a selected category. The reference corpus 800 includes a set of one or more positive examples 802 of the category and a set of one or more negative examples 804 of the category.

FIG. 8B is a diagram illustrating a fold of the exemplary reference corpus of FIG. 8A in which certain positive 806 and negative 808 examples are selected for training an exemplary machine learning system and certain other positive 810 and negative 812 examples are selected for testing the machine learning system.

FIG. 8C is a diagram illustrating a different fold of the exemplary reference corpus of FIG. 8A in which certain positive 814 and negative 816 examples are selected for training an exemplary machine learning system and certain other positive 818 and negative 820 examples are selected for testing the machine learning system. The training and test examples selected in FIG. 8C are different from those selected in FIG. 8B. One of ordinary skill in the art will recognize that the exemplary folds of FIGS. 8B and 8C are presented merely for illustrative purposes and that any number of suitable folds may be used.

Exemplary Generation of Exemplary Training Vectors

Figure 10:
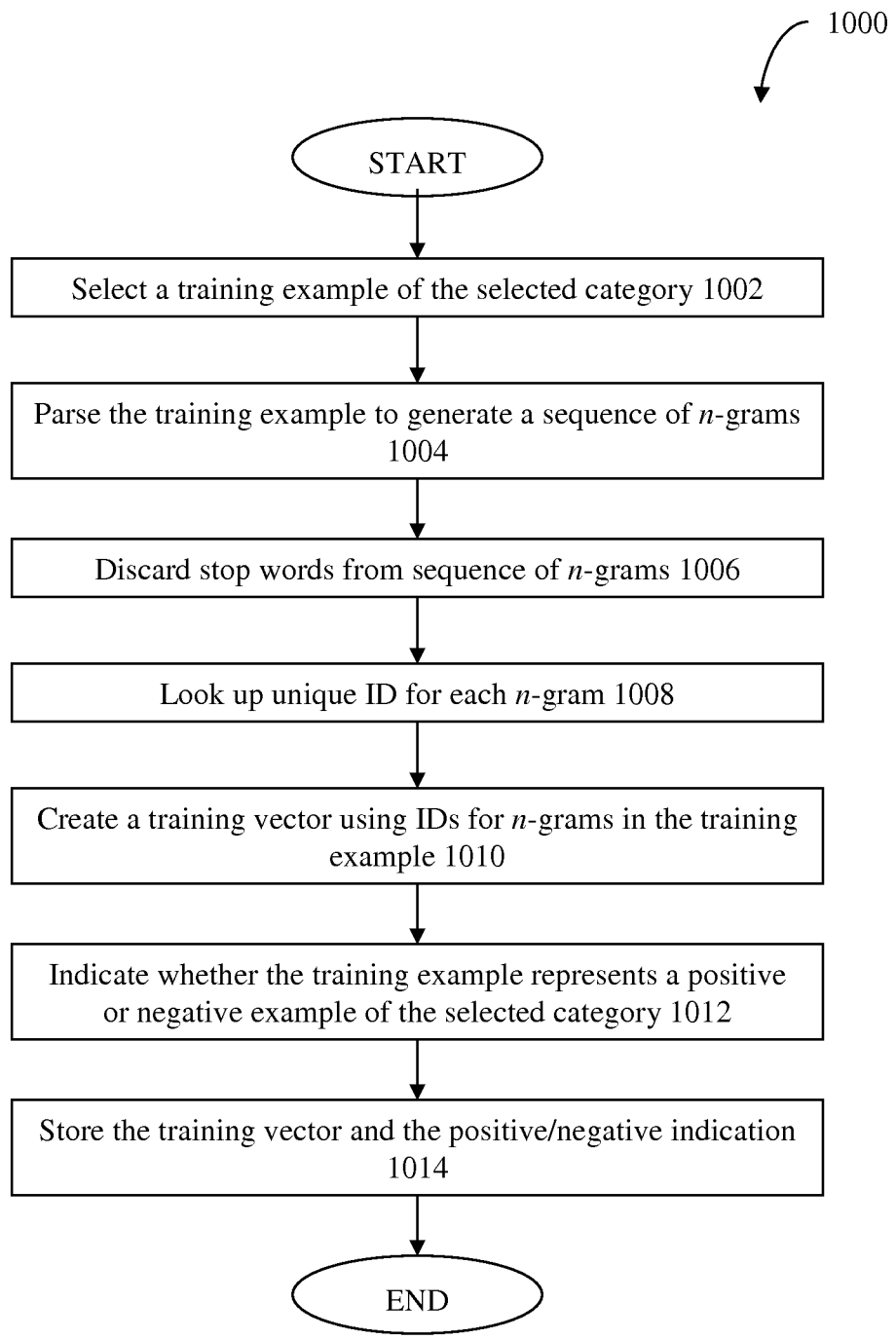
FIG. 10 is a flowchart illustrating an exemplary computer-implemented and computer-executable method for generating a training vector for training a machine learning system implementing a machine learning algorithm embodied on one or more computer-readable media on a selected category.

FIG. 10 is a flowchart showing an exemplary computer-implemented and computer-executable method 1000 for generating a training vector for training a machine learning system on a selected category. In step 1002, exemplary embodiments may select a training example of the selected category from a reference corpus. The example may be a positive example or a negative example of the selected category.

In step 1004, exemplary embodiments may parse the selected example to generate a sequence of one or more n-grams in the selected example. Exemplary n-grams include, but are not limited to, unigrams and bigrams, unigrams and bigrams and trigrams, and the like.

In step 1006, exemplary embodiments may remove one or more predefined stop words from the generated unigrams. In the exemplary embodiment illustrated in FIG. 10, stop words may be discarded after the n-grams are generated. In another exemplary embodiment, stop words may be discarded before the n-grams are generated. In another exemplary embodiment, stop words may be retained in the sequence of n-grams.

Certain non-word textual features are predictive of whether a textual example falls into a selected category. Examples of these features include, but are not limited to, capitalization, question marks, exclamation points, and the like.

In step 1008, exemplary embodiments may look up in the features table the unique identifier for each n-gram generated based on the selected training example.

In step 1010, exemplary embodiments may create a training vector associated with the selected example based on the unique identifiers for the n-grams. In an exemplary embodiment, the training vector may be a combination of the unique identifiers for the n-grams, for example, a concatenation of the unique identifiers for the n-grams.

In step 1012, exemplary embodiments may include a category indication for the selected example in the training vector, indicating whether the selected example is a positive or a negative example of the selected category. This category indication may be looked up in the reference corpus.

In step 1014, the training vector may be stored on a storage device. The training vector may be stored directly in the reference corpus or in a separate database.

Figure 11:
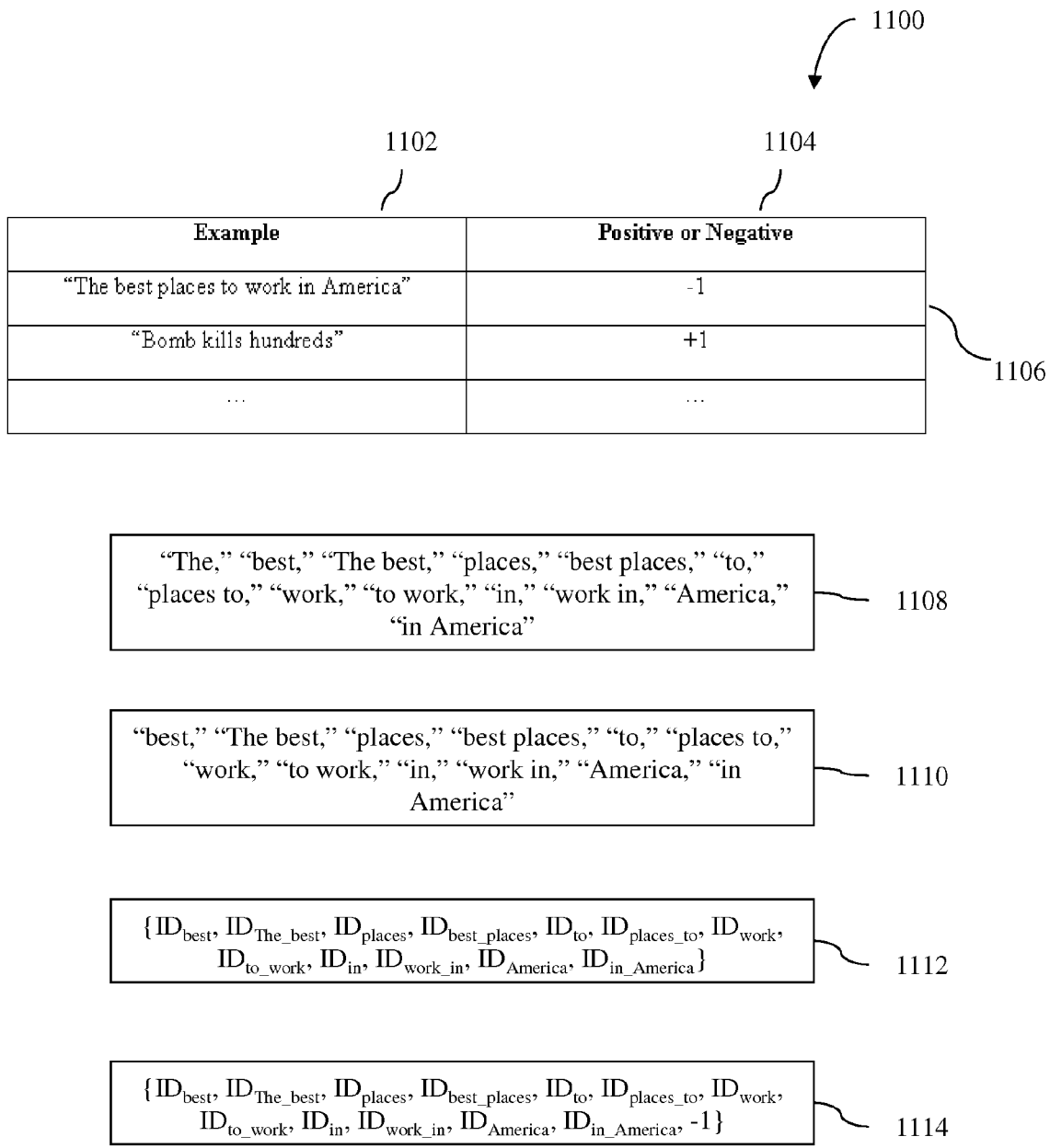
FIG. 11 is a diagram showing an exemplary use of the exemplary method of FIG. 10.

FIG. 11 is a diagram illustrating an exemplary use of the method 1000 of FIG. 10. In the exemplary use of FIG. 11, a negative example 1106 of the exemplary category "scary" is selected from a reference corpus 1100 and used to generate a training vector that may be used to train an exemplary machine learning system.

The reference corpus 1100 is provided for the selected category and includes a collection of positive and negative examples 1102 of the category "scary" and, for each example, an indication 1104 of whether the example is a positive example or a negative example.

An exemplary negative example 1106 (for example, web page article content including the text "The best places to work in America") of the category "scary" is selected from the reference corpus 1100 to be used in training the machine learning system. Alternatively, a positive example may be selected. The example may be selected automatically or by a user.

The example 1106 is parsed into a sequence of n-grams 1108 ("The," "best," "The best," "places," "best places," "to," "places to," "work," "to work," "in," "work in," "America," "in America"). In an exemplary embodiment, one or more stop words are removed from the generated unigrams (for example, the unigram "The") to generated a processed sequence of n-grams 1110. The processed sequence n-grams is associated with a sequence of unique IDs 1112 corresponding to the n-grams. The unique IDs may be looked up in a features table. The sequence of unique IDs 1112 may be used as a training vector in training an exemplary training example.

An indication of whether the training vector corresponds to a positive example or a negative example of the category "scary" is provided to the machine learning system along with the training vector. This indication may be looked up in the reference corpus 1100. In an exemplary embodiment illustrated in FIG. 11, the indication may be included directly in the training vector 1114, for example, as binary variable value (in one example, +1 for a positive example or −1 for a negative example). In another exemplary embodiment, the indication may be provided to the machine learning system separately from the training vector.

Exemplary Generation of Exemplary Test Vectors

Figure 12:
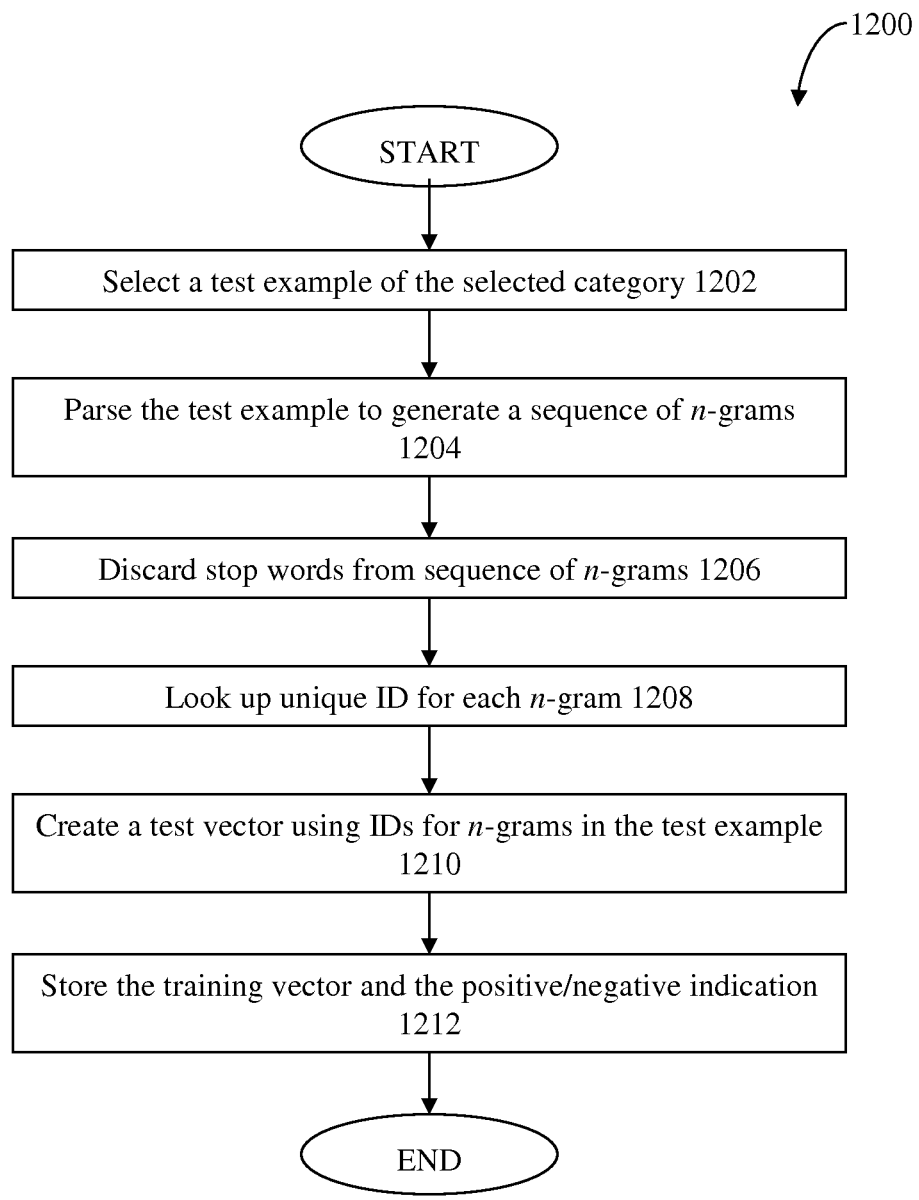
FIG. 12 is a flowchart illustrating an exemplary computer-implemented and computer-executable method for generating a test vector for testing a trained machine learning system implementing a machine learning algorithm embodied on one or more computer-readable media on a selected category.

FIG. 12 is a flowchart showing an exemplary computer-implemented and computer-executable method 1200 according to the present invention for generating a test vector for testing a trained machine learning system on a selected category. In step 1202, exemplary embodiments may select a test example of the selected category from a reference corpus. The example may be a positive example or a negative example of the selected category.

In step 1204, exemplary embodiments may parse the selected example to generate a sequence of one or more n-grams based on the selected example.

In step 1206, exemplary embodiments may remove one or more predefined stop words from the generated unigrams. In the exemplary embodiment illustrated in FIG. 12, stop words may be discarded after the n-grams are generated. In another exemplary embodiment, stop words may be discarded before the n-grams are generated. In another exemplary embodiment, stop words may be retained in the sequence of n-grams.

Certain non-word textual features that are predictive of unsuitable content may be retained. Examples of these textual features include, but are not limited to, capitalization, question marks, exclamation points, and the like.

In step 1208, exemplary embodiments may look up in the features table the unique identifier for each n-gram generated based on the selected test example.

In step 1210, exemplary embodiments may generate a test vector associated with the selected example based on the unique identifiers for the n-grams. In an exemplary embodiment, the test vector may be a combination of the unique identifiers for the n-grams, for example, a concatenation of the unique identifiers for the n-grams.

In step 1212, the test vector may be stored on a storage device. The test vector may be stored directly in the reference corpus or in a separate database.

Figure 13:
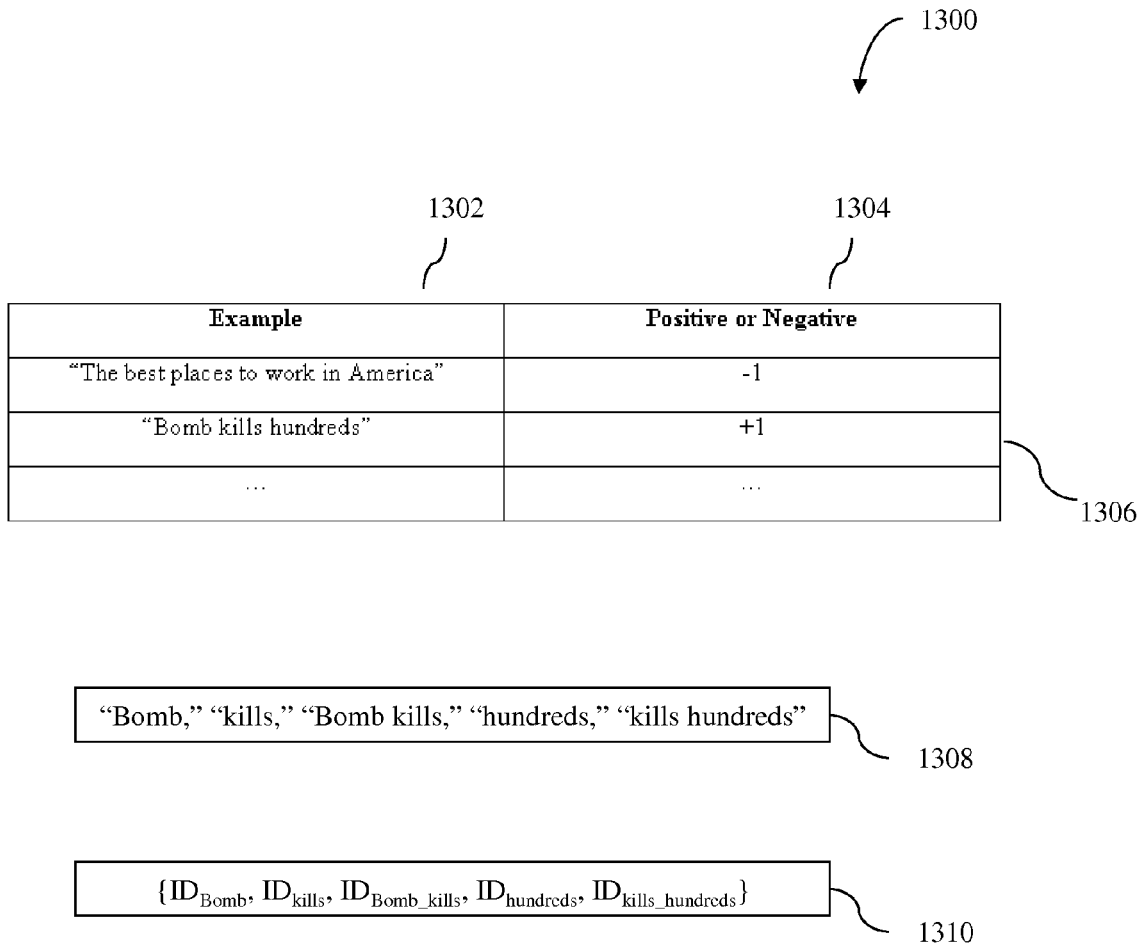
FIG. 13 is a diagram showing an exemplary use of the exemplary method of FIG. 12.

FIG. 13 illustrates a pictorial representation of an exemplary use of the method 1000 of FIG. 10. In the exemplary use of FIG. 13, a positive example 1306 of the exemplary category "scary" is selected from a reference corpus 1300 and used to generate a test vector that may be used to test an exemplary trained machine learning system.

The reference corpus 1300 is provided for the selected category and includes a collection of positive and negative examples 1302 of the category "scary" and, for each example, an indication 1304 of whether the example is a positive example or a negative example.

An exemplary positive example 1306 (for example, a new story titled "Bomb kills hundreds") of the category "scary" is selected from the reference corpus 1300 to be used in testing the machine learning system. Alternatively, a positive example may be selected. The example may be selected automatically or by a user.

The example 1306 is parsed into a sequence of n-grams 1308 ("Bomb," "kills," "Bomb kills," "hundreds," "kills hundreds"). In an exemplary embodiment, one or more stop words are removed from the generated unigrams. The sequence of n-grams is associated with a sequence of unique IDs 1310 corresponding to the n-grams. The unique IDs may be looked up in a features table. The sequence of unique IDs 1310 may be used as a test vector in testing an exemplary machine learning system.

Exemplary Computer-Implemented and
Computer-Executable Implementation of Boosting
Systems The exemplary machine learning system may employ a weak learner that follows a set of rules to classify any given piece of text into a positive or a negative example of a selected category. The exemplary machine learning system may also employ a boosting system employing a boosting algorithm for improving the accuracy of the weak learner. In an exemplary embodiment, the exemplary boosting algorithm may call a selected weak learner repeatedly on a set of training examples in a series of rounds. Before each round, the boosting algorithm may update a distribution of weights over the training examples to indicate the importance of certain training examples.

An exemplary boosting algorithm that may be embodied on a non-transitory computer-readable medium for use in accordance with exemplary embodiments is described with reference to FIG. 14. One of ordinary skill in the art will recognize that this boosting algorithm is illustrative and does not limit the scope of the invention. One of ordinary skill in the art will recognize that any suitable weak learner and any suitable boosting algorithm may be used in accordance with exemplary embodiments.

Figure 14:
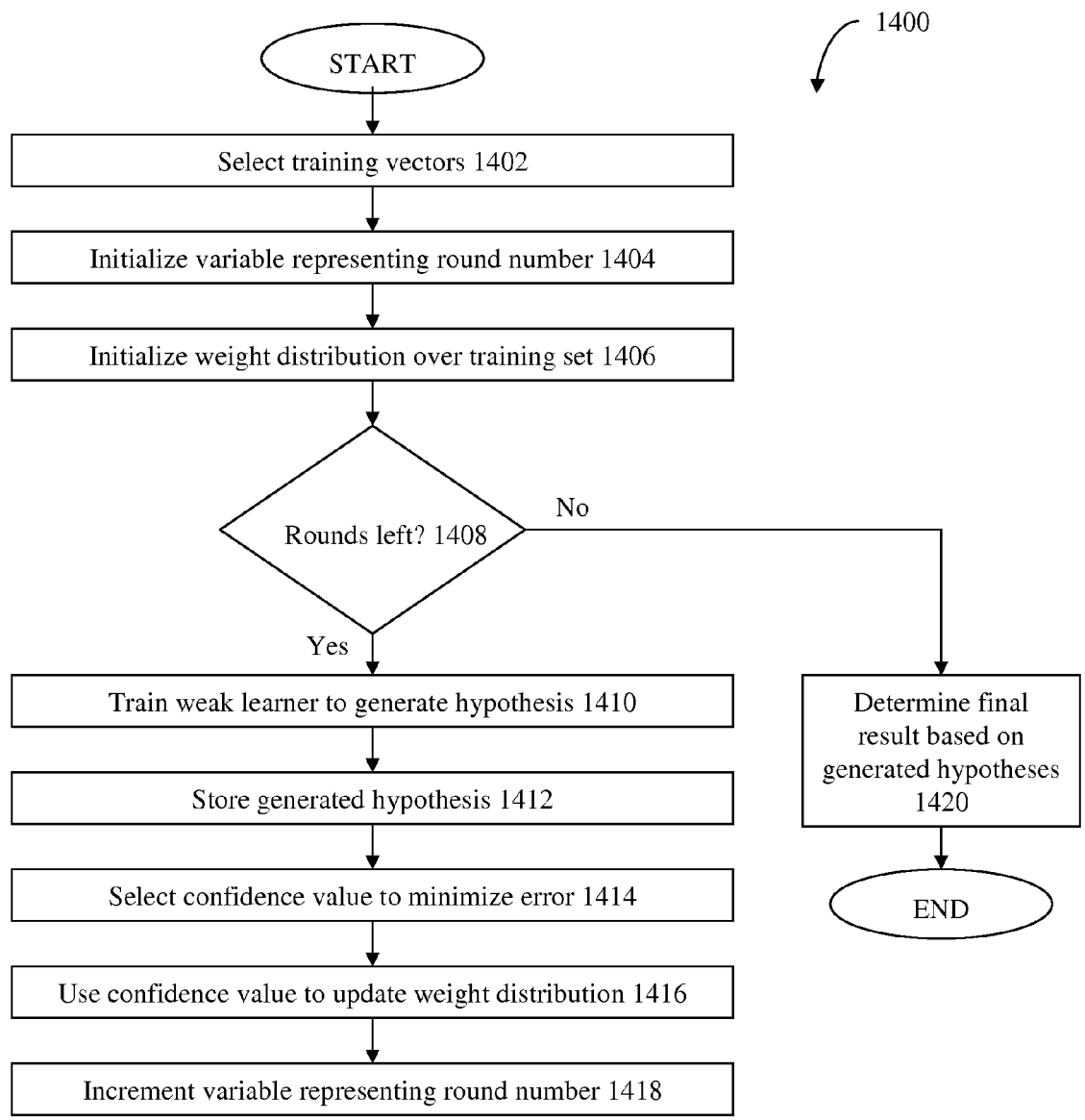
FIG. 14 is a flowchart illustrating an exemplary computer-implemented and computer-executable method for implementing an exemplary boosting system implementing an exemplary boosting algorithm embodied on one or more computer-readable media algorithm.

FIG. 14 is a flowchart illustrating an exemplary computer-implemented and computer-executable method 1400 for implementing an exemplary boosting algorithm. The method 1400 may perform training over T rounds in an exemplary embodiment, in which a weak learner is trained on a set of examples and used to generate a hypothesis in each round.

In step 1402, m training examples may be selected at random and training vectors associated with the m examples are used in the boosting algorithm. Each training example vector includes a collection of the unique n-gram IDs in the example (denoted as x) and an indication (denoted as y) of whether the example is a positive example (+1) or a negative example (−1). Training set: $\{(x_1, y_1), \ldots, (x_m, y_m)\}$, where $$x_i \in \chi$$

$$y_i \in \gamma = \{-1, +1\}$$

In step 1404, a variable (t) representing the number of the present round may be initialized to 1, i.e., t=1. Alternatively, in an exemplary embodiment, the variable may already be initialized and step 1404 may be skipped.

In step 1406, a weight distribution ($D_t$) over the training set is initialized for a first round of training (t=1) using the training examples. Alternatively, in an exemplary embodiment, the weight distribution may already by initialized and step 1406 may be skipped.

In an exemplary embodiment, the weight distribution is uniform over all training examples, i.e., $D_t=1/m$. General weight distribution over training set ($D_t$): $D_t$ on $\{1, \ldots, m\}$ Initial weight distribution over training set for first round ($D_1$): $D_1=1/m$ In an exemplary embodiment, the method 1400 is over when T rounds are completed.

In step 1408, the method may determine whether T rounds have not been completed and if there are rounds left to complete. For example, the present round number is checked to determine if the total number of rounds has reached T. If the present round number is equal to or less than T, then the "Yes" branch is taken.

In step 1410, the weak learner may be trained using the weight distribution ($D_t$) to generate a hypothesis ($h_t$). In step 1412, the generated hypothesis ($h_t$), i.e., the classifier obtained after training, may be stored on a storage device, and may be expressed as follows:

$$h_t: \chi \to \{-1, +1\}$$

In step 1414, a confidence value ($\alpha_t$) is selected to minimize error, as follows:

$$\alpha_t \in R$$

In step 1416, the confidence value is used to compute an updated weight distribution to be used in the subsequent round, as follows:

$$D_{t+1}(i) = \frac{D_t(i) e^{-\alpha_t y_i h_t(x_i)}}{Z_t}$$

In step 1418, the present round is incremented by one, as follows:

$$t = t+1$$

After the present round is incremented, the method returns to step 1408 to determine if a total of T rounds have been completed. If the present round is greater than T, then the "No" branch is taken.

In step 1420, upon completion of all of the rounds, a final result (H(x)) is determined based on the hypotheses (h$_t$) determined at each round. In an exemplary embodiment, the final result is a weighted sum of the hypotheses, expressed as follows:

$$H(x) = \mathrm{sign}\,(f(x))$$
$$= \mathrm{sign}\left(\sum_{t=1}^{T} \alpha_t h_t(x)\right)$$

One of ordinary skill in the art will recognize that any suitable boosting algorithm may be used to improve the accuracy of a weak learner in categorizing content as positive or negative examples of a selected category.

Exemplary Use of Exemplary Trained Machine Learning Systems

FIG. 15 is a flowchart illustrating an exemplary computer-implemented and computer-executable method 1500 that may be used to categorize textual content. In step 1502, exemplary embodiments may receive the textual content. The textual content may be contained in a portion of an advertisement or a portion of a web page article.

In step 1504, exemplary embodiments may process the selected content to generate a vector that may be used by an exemplary trained machine learning system to determine whether the selected content is a positive example of a predefined binary category. In an exemplary embodiment, the vector may be generated in accordance with exemplary method 1300 illustrated in FIG. 13.

In step 1506, exemplary embodiments may parse the selected content to generate a sequence of one or more n-grams based on the selected content.

In step 1508, exemplary embodiments may remove one or more predefined stop words from the sequence of n-grams.

In step 1510, exemplary embodiments may look up in the features table the unique identifier for each n-gram generated based on the selected content, and generate a combination of the unique identifiers for the n-grams, for example, a concatenation of the unique identifiers for the n-grams. In an exemplary embodiment, the combination of the unique identifiers may be used as a vector.

In step 1512, exemplary embodiments may run an exemplary trained machine learning system on the generated vector using an predefined set of optimal parameters, for example, an optimal learner, an optimal number of rules, an optimal error bound, and the like. The trained machine learning system may analyze the vector based on its prior training and generate the likelihood of the selected content being a positive example of the predefined category.

The likelihood indication generated by the machine learning system may take any suitable form including, but not limited to, a quantitative indication such as a fractional probability value (ranging from 0.0 for the strongest likelihood that the content is a negative example of the category to 1.0 for the strongest likelihood that the content is a positive example of the category), a percentage probability value (ranging from 0% for the strongest likelihood that the content is a negative example of the category to 100% for the strongest likelihood that the content is a positive example of the category), positive numbers for positive examples and negative numbers for negative examples, negative numbers for positive examples and positive numbers for negative examples, and the like.

The likelihood indication may also be any suitable range of numbers, for example, ranging from zero (for the strongest likelihood that the content is a negative example of the category) to any positive number like 100 (for the strongest likelihood that the content is a positive example of the category), ranging from a negative number like −100 (for the strongest likelihood that the content is a negative example of the category) to any positive number like 100 (for the strongest likelihood that the content is a positive example of the category).

In an exemplary embodiment, any likelihood indication (for example, −50 to 50) may be transformed into a corresponding range of probabilities (for example, 0.0 to 1.0) for further processing.

One of ordinary skill in the art may recognize that inverse logic may be used in configuring the likelihood indication. For example, positive numbers may be used for negative examples and negative numbers may be used for positive examples.

In step 1514, exemplary embodiments may perform one or more actions in response to the indication of whether the selected content falls into the predefined category. FIG. 1 illustrates an exemplary method 100 that may be used to take one or more actions in response to an indication of whether a selected content falls into a predefined category.

III. EXEMPLARY COMPUTING DEVICES

Figure 16:
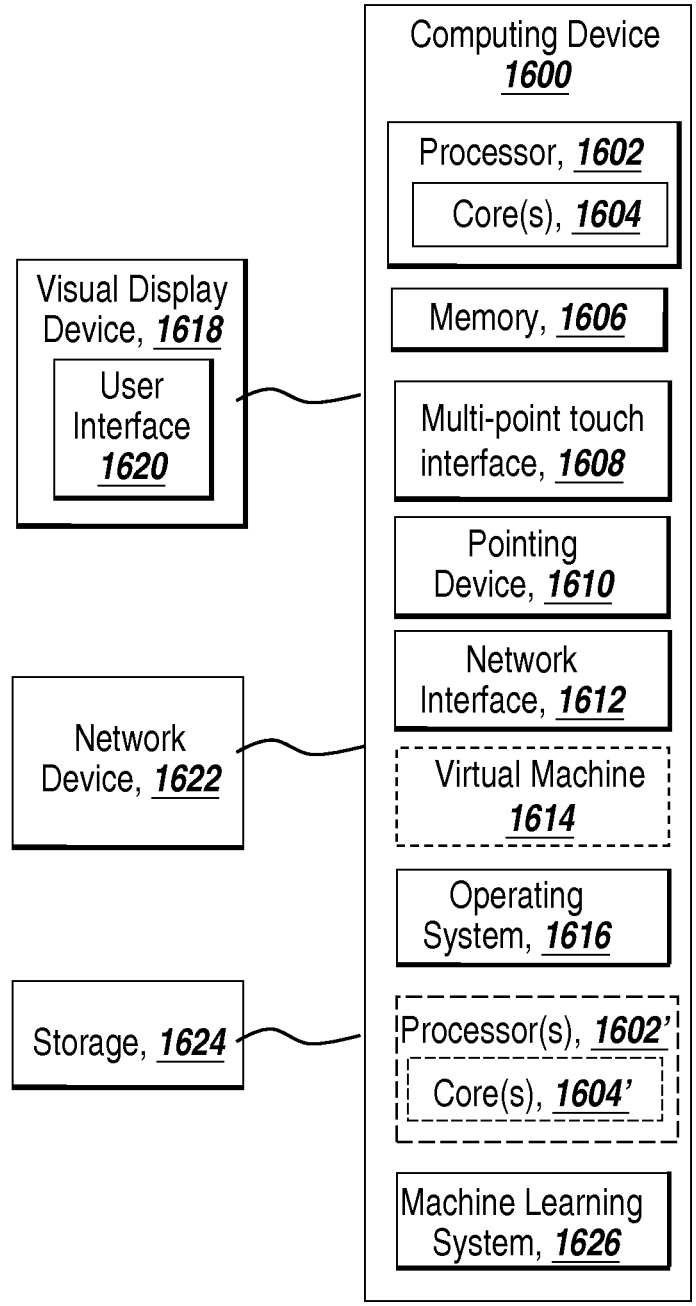
FIG. 16 is a block diagram showing an exemplary computing device that may be used to perform any of the methods provided by exemplary embodiments.

FIG. 16 is a block diagram of an exemplary computing device 1600 that may be used in to perform any of the methods provided by exemplary embodiments. The computing device 1600 includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. For example, memory 1606 included in the computing device 1600 may store computer-executable instructions or software for implementing exemplary embodiments. The computing device 1600 also includes processor 1602 and, optionally, one or more additional processor(s) 1602' for executing computer-executable instructions or software stored in the memory 1606, and other programs for controlling system hardware. Processor 1602 and optional processor(s) 1602' may each be a single core processor or multiple core (1604 and 1604') processor.

Virtualization may be employed in the computing device 1600 so that infrastructure and resources in the computing device may be shared dynamically. A virtual machine 1614 may be provided to handle a process running on multiple processors so that the process appears to be using only one computing resource rather than multiple computing resources. Multiple virtual machines may also be used with one processor.

Memory 1606 may include a computer system memory or random access memory, such as DRAM, SRAM, EDO RAM, and the like. Memory 1606 may include other types of memory as well, or combinations thereof.

A user may interact with the computing device 1600 through a visual display device 1618, such as a computer monitor, which may display one or more user interfaces 1620 or any other interface. In exemplary embodiments, the display device 1618 may output or display one or more web page articles, one or more advertisements published on a web page associated with a web page article, and/or numeric likelihoods associated with one or more advertisements and/or one or more web page articles. The display device 1618 may also display other aspects, elements and/or information or data associated with exemplary embodiments.

The computing device 1600 may include other I/O devices such a keyboard or a multi-point touch interface 1608 and a pointing device 1610, for example a mouse, for receiving input from a user. The keyboard 1608 and the pointing device 1610 may be connected to the visual display device 1618. The computing device 1600 may include other suitable conventional I/O peripherals. The computing device 1600 may also include a storage device 1624, such as a hard-drive, CD-ROM, or other computer readable media, for storing data and computer-readable instructions or software that implement exemplary embodiments.

The computing device 1600 may include a network interface 1612 configured to interface via one or more network devices 1622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1612 may include a built-in network adapter, network interface card, PCMCIA network card, card bus network adapter, wireless network adapter, USB network adapter, modem or any other device suitable for interfacing the computing device 1600 to any type of network capable of communication and performing the operations described herein. Moreover, the computing device 1600 may be any computer system, such as a workstation, desktop computer, server, laptop, handheld computer or other form of computing or telecommunications device that is capable of communication and that has sufficient processor power and memory capacity to perform the operations described herein.

The computing device 1600 may run any operating system 1616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system 1616 may be run in native mode or emulated mode. In an exemplary embodiment, the operating system 1616 may be run on one or more cloud machine instances.

The computing device 1600 may include a machine learning system 1626 implementing one or more machine learning and boosting algorithms encoded on one or more non-transitory computer-readable media. The machine learning system 1626 may be used to analyze one or more advertisements and portions of one or more web page articles to generate one or more numeric likelihoods that the analyzed content falls into a predefined content category. In an exemplary embodiment, one or more inputs and/or one or parameter values of the machine learning system 1626 may be entered by a user using the user interface 1620 of the display device 1618. In an exemplary embodiment, one or more outputs of the machine learning system 1626 may be output, for example, printed or displayed, on the user interface 1620 on the display device 1618. In exemplary embodiments, the machine learning system 1626 may be stored in the memory 1606 and/or the storage 1624.

IV. EXEMPLARY NETWORK ENVIRONMENTS

Figure 17:
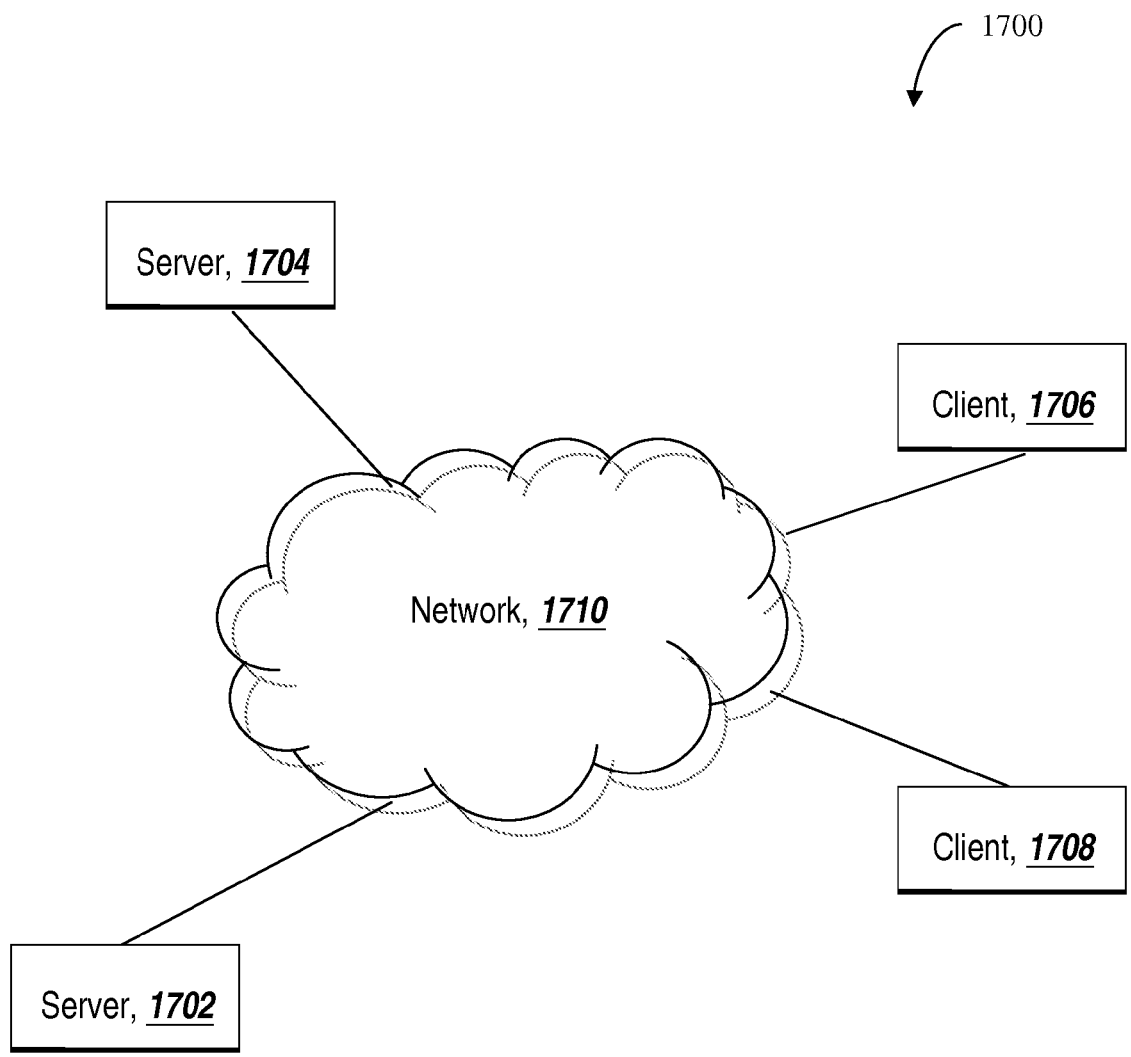
FIG. 17 is a diagram showing an exemplary network environment suitable for a distributed implementation of exemplary embodiments.

FIG. 17 is an exemplary network environment 1700 suitable for a distributed implementation of exemplary embodiments. The network environment 1700 may include one or more servers 1702 and 1704 coupled to one or more clients 1706 and 1708 via a communication network 1710. The network interface 1612 and the network device 1622 of the computing device 1600 enable the servers 1702 and 1704 to communicate with the clients 1706 and 1708 via the communication network 1710. The communication network 1710 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1710 are capable of supporting distributed implementations of exemplary embodiments.

In an exemplary embodiment, the servers 1702 and 1704 may provide the clients 1706 and 1708 with computer-readable and/or computer-executable components or products under a particular condition, such as a license agreement. The computer-readable and/or computer-executable components or products may include those for providing and implementing an exemplary machine learning system. The clients 1706 and 1708 may train and test an exemplary machine learning system using the computer-readable and/or computer-executable components and products provided by the servers 1702 and 1704, and submit the trained machine learning system to the servers 1702 and 1704 for using the trained machine learning system to manage publication of online advertisements.

Alternatively, in another exemplary embodiment, the clients 1706 and 1708 may provide the servers 1702 and 1704 with computer-readable and/or computer-executable components or products under a particular condition, such as a license agreement. The computer-readable and/or computer-executable components or products may include those for providing and implementing an exemplary machine learning system. The servers 1702 and 1704 may train and test an exemplary machine learning system using the computer-readable and/or computer-executable components and products provided by the clients 1706 and 1708, and submit the trained machine learning system to the clients 1706 and 1708 for using the trained machine learning system to manage publication of online advertisements.

V. INCORPORATION BY REFERENCE

The contents of all references, including patents and patent applications, cited throughout this application are hereby incorporated herein by reference in their entirety. The appropriate components and methods of those references may be selected for the invention and embodiments thereof. Still further, the components and methods identified in the Background section are integral to this disclosure and may be used in conjunction with or substituted for components and methods described elsewhere in the disclosure within the scope of the invention.

VI. EQUIVALENTS

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

What is claimed is:

1. A computer-executable method for managing publication of an advertisement, the method comprising the following operations performed by one or more processors:
    generating a first probability that the advertisement is associated with a first category unsuitable for publication;
    comparing the first probability to a first set of one or more threshold values associated with the first category;
    generating a second probability that the advertisement is associated with a second category unsuitable for publication;
    comparing the second probability to a second set of one or more threshold values associated with the second category; and
    determining whether to publish the advertisement based on the comparison of at least one of the first probability to the first set of threshold values or the second probability to the second set of threshold values.

2. The computer-executable method of claim 1, wherein the generating of the first probability comprises:
    analyzing a content of the advertisement by using a trained processing system implementing a machine learning algorithm embodied on one or more computer-readable media.

3. The computer-executable method of claim 2, wherein the analyzing of the content of the advertisement comprises:
    parsing textual content of the advertisement into a sequence of n-grams; and
    analyzing the sequence of n-grams using the trained processing system to generate the first probability that the advertisement is associated with the first category unsuitable for publication.

4. The computer-executable method of claim 1, wherein the first set of threshold values includes:
    a first threshold; and
    a second threshold, the first threshold being smaller in magnitude than the second threshold.

5. The computer-executable method of claim 4, wherein the determining of whether to publish the advertisement based on the comparison of the first probability to the first set of threshold values comprises:
    determining that the advertisement can be automatically published if the first probability is smaller in magnitude than the first threshold.

6. The computer-executable method of claim 4, wherein the determining of whether to publish the advertisement based on the comparison of the first probability to the first set of threshold values comprises:
    determining that the advertisement can be automatically excluded from publication if the first probability is greater in magnitude than the second threshold.

7. The computer-executable method of claim 4, wherein the determining of whether to publish the advertisement based on the comparison of the first probability to the first set of threshold values comprises:
    taking an action to perform a review of the advertisement if the first probability is greater than first threshold and smaller than the second threshold.

8. The computer-executable method of claim 5, further comprising:
    automatically publishing the advertisement if the first probability is smaller in magnitude than the first threshold.

9. The computer-executable method of claim 6, further comprising:
    automatically publishing an article without the advertisement if the first probability is greater in magnitude than the second threshold.

10. The computer-executable method of claim 1, wherein the generating of the first probability and the generating of the second probability comprise:
    analyzing a content of the advertisement by using a trained processing system implementing a machine learning algorithm embodied on one or more computer-readable media.

11. The computer-executable method of claim 10, wherein the analyzing of the content of the advertisement comprises:
    parsing textual content of the advertisement into a sequence of n-grams; and
    analyzing the sequence of n-grams using the trained processing system to generate the first probability that the advertisement is associated with the first category unsuitable for publication and to generate the second probability that the advertisement is associated with the second category unsuitable for publication.

12. The computer-executable method of claim 1, wherein the second set of threshold values includes:
    a third threshold; and
    a fourth threshold, the third threshold being smaller in magnitude than the fourth threshold.

13. The computer-executable method of claim 12, wherein the determining of whether to publish the advertisement based on the comparison of the second probability to the second set of threshold values comprises:
    determining that the advertisement can be automatically published if the second probability is smaller in magnitude than the third threshold.

14. The computer-executable method of claim 12, wherein the determining of whether to publish the advertisement based on the comparison of the second probability to the second set of threshold values comprises:
    determining that the advertisement can be automatically excluded from publication if the second numeric likelihood is greater in magnitude than the fourth threshold.

15. The computer-executable method of claim 12, wherein the determining of whether to publish the advertisement based on the comparison of the second probability to the second set of threshold values comprises:
    taking an action to perform a review of the advertisement if the second probability is greater than third threshold and smaller than the fourth threshold.

16. The computer-executable method of claim 13, further comprising:
automatically publishing the advertisement if the second probability is smaller in magnitude than the third threshold.

17. The computer-executable method of claim 14, further comprising:
automatically publishing an article without the advertisement if the second probability is greater in magnitude than the fourth threshold.

18. A non-transitory computer-readable medium encoded with computer-executable instructions for performing a method for managing publication of an advertisement using a computing device, the method comprising the following operations performed by one or more processors:
generating a first probability that the advertisement is associated with a first category unsuitable for publication;
comparing the first probability to a first set of one or more threshold values associated with the first category;
generating a second probability that the advertisement is associated with a second category unsuitable for publication;
comparing the second probability to a second set of one or more threshold values associated with the second category; and
determining whether to publish the advertisement based on the comparison of at least one of the first probability to the first set of threshold values or the second probability to the second set of threshold values.

19. The computer-readable medium of claim 18, wherein the generating of the first probability comprises:
analyzing a content of the advertisement by using a trained processing system implementing a machine learning algorithm embodied on one or more computer-readable media.

20. The computer-readable medium of claim 19, wherein the analyzing of the content of the advertisement comprises:
parsing textual content of the advertisement into a sequence of n-grams; and
analyzing the sequence of n-grams using the trained processing system to generate the first probability that the advertisement is associated with the first category unsuitable for publication.

21. The computer-readable medium of claim 18, wherein the first set of threshold values includes:
a first threshold; and
a second threshold, the first threshold being smaller in magnitude than the second threshold.

22. The computer-readable medium of claim 21, wherein the determining of whether to publish the advertisement based on the comparison of the first probability to the first set of threshold values comprises:
determining that the advertisement can be automatically published if the first probability is smaller in magnitude than the first threshold.

23. The computer-readable medium of claim 22, further comprising:
automatically publishing the advertisement if the first probability is smaller in magnitude than the first threshold.

24. The computer-readable medium of claim 21, wherein the determining of whether to publish the advertisement based on the comparison of the first probability to the first set of threshold values comprises:
determining that the advertisement can be automatically excluded from publication if the first probability is greater in magnitude than the second threshold.

25. The computer-readable medium of claim 24, further comprising:
automatically publishing an article without the advertisement if the first probability is greater in magnitude than the second threshold.

26. The computer-readable medium of claim 18, wherein the generating of the first probability and the generating of the second probability comprise:
analyzing a content of the advertisement by using a trained processing system implementing a machine learning algorithm embodied on one or more computer-readable media.

27. The computer-readable medium of claim 26, wherein the analyzing of the content of the advertisement comprises:
parsing textual content of the advertisement into a sequence of n-grams; and
analyzing the sequence of n-grams using the trained processing system to generate the first probability that the advertisement is associated with the first category unsuitable for publication and to generate the second probability that the advertisement is associated with the second category unsuitable for publication.

28. A computer-executable method for managing publication of an advertisement, the method comprising the following operations performed by one or more processors:
generating a probability that the advertisement is associated with a category unsuitable for publication;
comparing the probability to a first threshold value and a second threshold value associated with the category, wherein
the first threshold value and the second threshold value are generated based on an distribution of a plurality of advertisement examples in a reference corpus over the first threshold value and the second threshold value;
generating a second probability that the advertisement is associated with a second category unsuitable for publication;
comparing the second probability to a second set of one or more threshold values associated with the second category; and
determining whether to publish the advertisement based on the comparison of at least one of the first probability to the first set of threshold values or the second probability to the second set of threshold values.

* * * * *